(12) United States Patent
Arai et al.

(10) Patent No.: US 7,440,135 B2
(45) Date of Patent: Oct. 21, 2008

(54) DETERMINING METHOD FOR LATTICE POINT FOR CORRESPONDENCE DEFINITION DATA CREATION AND IMAGE PROCESSOR

(75) Inventors: Yoshifumi Arai, Nagano (JP); Takashi Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1016 days.

(21) Appl. No.: 10/687,574

(22) Filed: Oct. 15, 2003

(65) Prior Publication Data

US 2004/0234127 A1 Nov. 25, 2004

(30) Foreign Application Priority Data

Oct. 17, 2002 (JP) .............................. 2002-303137
Oct. 17, 2002 (JP) .............................. 2002-303138

(51) Int. Cl.
G06F 15/00 (2006.01)

(52) U.S. Cl. .................... 358/1.9; 358/521; 358/518; 358/2.1; 382/167; 382/162; 345/604; 347/6

(58) Field of Classification Search ................ 382/167, 382/162; 358/518, 521, 1.9, 523, 2.1; 345/604, 345/600, 603, 589, 606; 347/6
See application file for complete search history.

(56) References Cited

U.S. PATENT DOCUMENTS

| | | | | |
|---|---|---|---|---|
| 5,331,440 | A | * | 7/1994 | Kita et al. .................... 358/529 |
| 6,081,653 | A | * | 6/2000 | Zandian ........................ 358/1.9 |
| 7,136,523 | B2 | * | 11/2006 | Fukao et al. ................. 382/167 |
| 2004/0263880 | A1 | * | 12/2004 | Ito et al. ........................ 358/1.9 |

FOREIGN PATENT DOCUMENTS

| | | |
|---|---|---|
| JP | 06-253139 | 9/1994 |
| JP | 09-247471 | 9/1997 |
| JP | 2001-061076 | 3/2001 |

(Continued)

OTHER PUBLICATIONS

Abstract of Japanese Patent Publication No. 06-253139, Pub. Date: Sep. 9, 1994, Patent Abstracts of Japan.

(Continued)

*Primary Examiner*—King Poon
*Assistant Examiner*—Jamares Washington
(74) *Attorney, Agent, or Firm*—Martine Penilla & Gencarella, LLP

(57) ABSTRACT

It used to be difficult to determine representative colors which allow color conversion with accuracy throughout color spaces without occurrences of local tone jump.

An ink quantity lattice point smoothness evaluation function for evaluating the smoothness of the disposition of ink quantity lattice points whose components are the ink quantities of inks in various colors and a CMY lattice point smoothness evaluation function for evaluating the smoothness of the disposition of CMY lattice points defined by CMY color components are defined. The CMY lattice points and the ink quantity lattice points wherein the ink quantity lattice point smoothness evaluation function and the CMY lattice point smoothness evaluation function are separately minimized are taken as lattice points for correspondence definition data creation. After both are separately substantially minimized, a binding condition is imposed so that the ink quantity lattices after readjustment will be converted into CMY color lattice points determined by the minimization by a predetermined transformation expression for converting ink quantity lattice points into CMY lattice points. Further, limitation on ink quantities adhering to a printing medium is imposed as a binding condition. Thus, the positions of the ink quantity lattice points are readjusted.

9 Claims, 9 Drawing Sheets

FOREIGN PATENT DOCUMENTS

| | | |
|---|---|---|
| JP | 2001-136401 | 5/2001 |
| JP | 2001-186367 | 7/2001 |
| JP | 2001-229367 | 8/2001 |
| JP | 2003-204443 | 7/2003 |

OTHER PUBLICATIONS

Abstract of Japanese Patent Publication No. 09-247471, Pub. Date: Sep. 19, 1997, Patent Abstracts of Japan.

Abstract of Japanese Patent Publication No. 2001-061076, Pub. Date: Mar. 6, 2001, Patent Abstracts of Japan.

Abstract of Japanese Patent Publication No. May 18, 2001, Pub. Date: May 18, 2001, Patent Abstracts of Japan.

Abstract of Japanese Patent Publication No. 2001-186367, Pub. Date: Jul. 6, 2001, Patent Abstracts of Japan.

Abstract of Japanese Patent Publication No. 2001-229367, Pub. Date: Aug. 24, 2001, Patent Abstracts of Japan.

Abstract of Japanese Patent Publication No. 2003-204443, Pub. Date: Jul. 18, 2003, Patent Abstracts of Japan.

\* cited by examiner

→ Differential vector between directions of reference

–··–··→ Parallel translation of differential vector before transition

·······→ Transition of differential vector

– – –→ Variation in differential vector between before transition and after transition ——— Indicates adjacency of lattice points O Indicates lattice point position → Differential vector between directions of reference ⇢ Parallel translation of differential vector before transition ⋯▶ Transition of differential vector --▶ Variation in differential vector between before transition and after transition ── Indicates adjacency of lattice points ○ Indicates lattice point position

DETERMINING METHOD FOR LATTICE POINT FOR CORRESPONDENCE DEFINITION DATA CREATION AND IMAGE PROCESSOR

BACKGROUND OF THE INVENTION

1. Field of the Invention

The present invention relates to a determining method for lattice points for correspondence definition data creation, an image processor, an image processing method, and a medium with an image processing program recorded thereon.

2. Description of the Prior Art

Image devices, such as displays and printers, usually use color image data which renders the color of each pixel using specific color components with gradations. Colors are defined in various color spaces to obtain image data. Such color spaces include, for example, RGB color space and CMY-based color space. In the RGB color space, three colors, R (Red), G (Green), and B (Blue) are used. In the CMY-based color space, C (cyan)-based colors, M (magenta)-based colors, and Y (yellow)-based colors (including lc (light cyan, lm (light magenta), DY (dark yellow), and K (black)) are used. In general, these colors are equipment-independent colors which are specific to each image device. Therefore, to output the same images in the same colors with different image devices, LUTs (look-up tables) are used. LUTs define color correspondence between devices.

It is unrealistic to define correspondence in LUT with respect to all the colors each image device can output because of storage capacity, workability in generating LUT, and the like. Usually, correspondence is defined with respect to a specific number of representative colors, and correspondence is computed by interpolation with respect to any other color. That is, an immense number of colors are not subjected to color measuring. Instead, colors are outputted from image devices to the extent that color measuring is actually performable. Then, color measuring is performed to define LUTs with respect to a specific number of representative colors.

To generate LUT, a specific number of these colors to be subjected to color measuring must be determined in advance. That is, a plurality of lattice points in color spaces must be determined. One of conventional lattice point determining methods is color separation. In color separation, cubic lattice points are defined in the RGB space, for example. Then, the RGB value of each lattice is subtracted form "255", the maximum gradation value of each color, to obtain virtual CMY values. The number of 3 of CMY colors is not matched with the number of inks in printing devices. Therefore, lattice points whose components are ink colors are determined by defining a specific correspondence for conversion and converting the three colors into six colors or like means. Lattice point determining methods other than color separation include, for example, the art disclosed in Japanese Patent Application No. 2002-2061.

By the above-mentioned lattice point determining method, it is difficult to determine representative colors wherewith color conversion can be performed throughout color spaces with accuracy without local tone jump in gradations. More specific description will be given. When color correspondence is computed using LUT, interpolation or the like is used as mentioned above. Therefore, with respect to colors other than the specific number of representative colors, color conversion accuracy, balance between colors (especially, gradations), and the like greatly depend on how the specific number of representative colors are selected. However, in color separation mentioned above, such processing as conversion of three colors into six colors is performed according to some sort of rule. Therefore, it is difficult to optimize lattice points through color spaces, taking various conditions into account on a case-by-case basis. Especially, with respect to printing devices, various conditions are imposed on specific colors. Such conditions include limitation on ink quantity injectable into paper for printing and limitation on use of K ink for the prevention of grainy appearance. Therefore, it is very difficult to take various conditions locally imposed into account and yet determine the lattice points of representative colors so that tone jump will not occur throughout.

SUMMARY OF THE INVENTION

The present invention has been made with the above-mentioned problem taken into account. The present invention is intended to provide a lattice point determining method for correspondence definition data creation, an image processor, an image processing method, and a medium with an image processing program recorded thereon, wherein the lattice points of representative colors which make tone jump less prone to occur throughout color spaces.

According to a first aspect of the present invention, the following is done to attain the above object: evaluation functions for evaluating the smoothness of lattice points are defined to determine lattice points which are referred to when correspondence definition data is created. The evaluation functions are substantially minimized, and there by the positions of the lattice points are optimized. To determine the lattice points of representative colors which make tone jump less prone to occur throughout color spaces, a plurality of evaluation functions are individually substantially minimized. That is, with respect to ink quantity lattice points whose components are color ink quantities, an ink quantity lattice point smoothness evaluation function for evaluating the smoothness of the disposition of the ink quantity lattice points is defined. With respect to CMY lattice points defined by the respective color components of CMY, a CMY lattice point smoothness evaluation function for evaluating the smoothness of the disposition of the CMY lattice points is defined. Then, the ink quantity lattice point smoothness evaluation function and the CMY lattice point smoothness evaluation function are individually substantially minimized. These functions are so defined that the lower their values are, the more favorable the smoothness of lattice points becomes. By minimizing these functions, the positions of lattice point are optimized, that is, the smoothness of lattice points becomes favorable.

At this time, the functions are individually minimized; therefore, the CMY lattice points and the ink quantity lattice points are separately optimized. The positions of the lattice points in the CMY color space and the positions of the lattice points in the color space whose components are ink colors are optimized in the respective color spaces. Since these lattice points are optimized based on the separate functions, the lattice points in the individual color spaces cannot be brought into one-to-one correspondence. After this optimization, however, the dispositions of the lattice points can be readjusted to bring them into certain correspondence. In that there is a possibility of readjustment, each evaluation function only has to be substantially minimized in the above optimization. That is, even if the evaluation functions are not strictly minimized, there is no problem. Certain correspondence can be established between the lattice points in the respective color spaces, and further, positions close to lattice point positions wherein the evaluation functions are minimized can be adopted. This is done by computing minimal values to grasp the optimal positions of lattice points in the respective color spaces and then making readjustment. As a result, correspondence definition data containing representative color lattice points wherein tone jump is less prone to occur can be determined.

As mentioned above, when separately optimized, the lattice points in the CMY color space and lattice points in the color space whose components are ink colors do not correspond to each other. To cope with this, the following is done in an in the aspect of the present invention: in the above optimization, each evaluation function is substantially minimized, and then readjustment is made. In this readjustment, such binding conditions that ink quantity lattice points after readjustment are converted into CMY color lattice points determined by the above minimization are imposed. Then, the ink quantity lattice points are moved. Thus, predetermined correspondence is established between the CMY lattice points and the ink quantity lattice points.

In addition, in this readjustment, ink quantity limitation is imposed as a binding condition, and further, the ink quantity lattice points are readjusted. The positions of the CMY lattice points and the positions of ink quantity lattice points are optimized before readjustment. Therefore, by moving the ink quantity lattice points, the ink quantity lattice points can be matched with the CMY lattice points as are optimized. Moreover, by reducing the movement of the ink quantity lattice points as much as possible, both the lattice points can be brought into correspondence with each other, the ink quantity lattice points also being substantially optimized. If ink quantity limitation is considered when the positions of the CMY lattice points and the ink quantity lattice points are optimized, it is very difficult to find the optimal solution with all the conditions taken into account. Further, even if lattice points are determined by the found solution and correspondence definition data is created, it is difficult to prevent the occurrence of tone jump throughout the color gamut.

However, this can be coped with by the present invention. According to the present invention, CMY lattice points and ink quantity lattice points are optimized, and then ink quantity limitation is considered. Therefore, such a solution as to optimize both the lattice points can be computed with ease regardless of ink quantity limitation. Furthermore, ink quantity limitation is considered in the end. Therefore, very realistic lattice points as lattice points for creating correspondence definition data in a printing device can be determined with ease. With correspondence definition data created as the result, tone jump is less prone to occur, and highly accurate color conversion can be performed.

When the above lattice points are determined, the individual evaluation functions need not be strictly minimized. Certain correspondence can be established between the lattice points in the respective color spaces, and further, positions close to lattice point positions wherein the evaluation functions are minimized can be adopted. This is done by computing minimal values to grasp the optimal positions of lattice points in the respective color spaces and then making readjustment.

The correspondence definition data only has to be data which defines color correspondence used in a printing device and another image device. For example, the data may be LUT or may be a so-called profile containing matrices which defines relations between colors. Inks used in printing devices are usually CMY-based inks, and in a printing device according to the present invention, more color inks than three, CMY, can be used. For example, four color inks in CMYK, six color inks in CMYKlclm, or more color inks can be used. In another image device according to the present invention, specific color components can be used to render various colors. For example, displays and the like which use the three colors of RGB as color components are possible.

RGB and CMY are so-called complementary colors to each other. If these colors are rendered in 256 (0 to 255) shades of gray, it is supposed that C=255-R, M=255-G, and Y=255-B. This relation is not strict. (Color matching by color measuring or the like is not performed.) However, the lattice points in the RGB color space and the lattice points in the CMY color space can be brought into one-to-one correspondence. When lattices for correspondence definition data creation are determined, lattice points in the CMY color space, not in the RGB color space, may be used.

The colors defined as lattice points in the CMY color space are CMY-based colors. Therefore, the lattice points can be brought into correspondence with the quantities of inks which are similarly in CMY-based colors. For example, by multiplying vector whose elements are six color inks by a 3×6 matrix, ink quantities can be brought into colors in the CMY color space. Therefore, it can be concluded that: when the disposition of lattice points in the CMY color space is optimized by the CMY lattice point smoothness evaluation function, the disposition of lattice points in the RGB color space is also optimized.

Lattice points in the CMY color space and lattice points in the ink quantity color space can be brought into correspondence with each other by a matrix or the like, as mentioned above. Therefore, in the above-mentioned substantial minimization of evaluation functions, the following processing can be performed: lattice points optimized in either color space are fixed, and lattice points optimized in the other color space are readjusted. The number of ink colors is larger than 3 of CMY. Therefore, the process of minimizing the ink quantity lattice point smoothness evaluation function is likely to give more solutions which give the minimum than the process of minimizing the CMY lattice point smoothness evaluation function does. If there are a large number of solutions, it is difficult to judge which solution is the optimal minimal value. In comparison, the optimal minimal value is easier to find in minimal values of CMY lattice points. Consequently, the following is preferably done: of optimized CMY lattice points and ink quantity lattice points, the CMY lattice points are fixed, and the above binding condition by matrix is imposed. Then, the disposition of ink quantity lattice points is readjusted.

The ink quantity lattice point smoothness evaluation function and the CMY lattice point smoothness evaluation function only have to be capable of evaluating the smoothness of the disposition of lattice points. Further, they only have to allow the positions of lattice points to be optimized by minimization of the functions. The smoothness of disposition is defined as the degree of skewness in the arrangement of lattice points arranged in a space. For example, if lattice points are arranged in cubic lattice shape in a three-dimensional space, there is no skewness. If lattice points are shifted from the cubic lattice point positions, skewness in the lattice is increased. Needless to add, the arrangement of lattice points need not be in cubic lattice shape. State in which lattice points are arranged in specific positions in order is referred to as state free from skewness. In this case, if skewness is increased by deviation from the specific positions, the smoothness is degraded. More specific description will be given. A sold formed by a plurality of lattice points will be considered. When parallel sides or parallel surfaces are reduced in number in the solid, skewness is considered to be increased. When parallel sides or parallel surfaces are increased in number in the solid, the smoothness is considered to be increased.

Here, a three-dimensional space has been taken as an example. Needless to add, in a color space whose color components are color inks used in a printing device, colors are defined in more than thee dimensions because the number of color components is greater than 3 in the space. In this color space as well, the smoothness can be defined on the analogy of three-dimensional space. That is, if ink quantity lattice points are arranged in specific lattice point positions in order (the relative positional relations between lattice points are substantially equal), the smoothness can be considered to be high. In general, the following can be said with respect to interpolative calculation of colors positioned between lattice points in a color space: the more orderly the lattice points are arranged, the better interpolation can be performed without great variation in interpolating accuracy depending on local positions in the space. Therefore, according to the present invention, a specific number of the following lattice point positions can be determined by optimizing the disposition of lattice points: the lattice point positions are where color measuring or the like is performed when correspondence definition data is created and tone jump is less prone to occur throughout the color space.

Further, the ink quantity lattice point smoothness evaluation function or the CMY lattice point smoothness evaluation function is not required to include only terms for evaluating the smoothness. That is, they are not required to include only terms whose value is increased when the smoothness is degraded. In addition to the evaluation of smoothness, other various conditions may be added. Also, in readjustment, a binding condition which adds ink quantity limitation only has to be imposed, in addition to transformation expressions which define the correspondence between CMY lattice points and ink quantity lattice points. Various limitations can be adopted as ink quantity limitation. For example, in a printing device, various conditions are imposed on specific colors. Such conditions include limitation on ink quantity injectable into paper for printing and limitation on use of K ink for the prevention of grainy appearance. Consequently, these conditions are incorporated into the evaluation functions. More specifically, terms whose value is increased with reduction in the degree of accordance with conditions, such as ink quantity limitation and limitation on use of K ink, are incorporated. Thus, when the smoothness of disposition of the above lattices is evaluated, optimization can be implemented with various binding conditions imposed.

According to a second aspect of the present invention, the following is done when evaluation values in the smoothness evaluation function is enhanced to optimize the positions of lattice points: the disposition of lattice points in a multi-dimensional color space and the disposition of lattice points in a lower-dimensional color space are separately optimized. After the optimization, the disposition of lattice points in either color space is substantially maintained, and further, the disposition of lattice points in the other color space is readjusted. Therefore, when the disposition of lattice points in each color space is optimized, the optimization is not influenced by the disposition of lattice points in the other color space. Thus, the disposition can be made closer to the true optimal disposition in each color space.

Further, according to a 10th aspect of the present invention, the disposition cannot only be made closer to the true optimal disposition in each color space. Also, ink quantity limitation can be reasonably considered with the optimal disposition prevented from being disturbed as much as possible.

Here again, when the dispositions of lattice points in the individual color spaces are separately optimized, they are optimized without establishing any correlation between the respective positions. Therefore, the dispositions of lattice points cannot be directly brought into one-to-one correspondence to obtain lattice points for correspondence definition data creation. However, after this optimization, the disposition of lattice points is readjusted. Therefore, by considering their positional relation during this readjustment, certain relation can be established between them. Thus, lattice points for creating correspondence definition data which make the lattice points in the two color spaces correspond to each other can be determined.

Further, according to the 10th aspect of the present invention, ink quantity limitation is considered in readjustment. Therefore, highly realistic lattice points can be determined with ease as lattice points for creating correspondence definition data in printing devices. Further, optimal solutions can be computed with ease because ink quantity limitation is not added when the above optimal positions of lattice points are determined. In readjustment, either of ink quantity lattice points and lower-dimensional color lattice points may be moved. In the present invention, however, it is preferable to move the ink quantity lattice points because ink quantity limitation is added. That is, when the ink quantity lattice points are moved, a binding condition wherein the ink quantity limitation is formulated is imposed. With this constitution, the binding condition can be imposed, and further, the ink quantity lattice points can be readjusted.

The disposition of each lattice point is determined by enhancing the smoothness of the disposition of lattice points. Therefore, correspondence definition data can be created by subjecting the color indicated by the lattice point to color measuring or the like. Thereby, correspondence definition data containing representative color lattice points which make tone jump less prone to occur can be determined.

At this time, the correspondence definition data only has to be data which defines the correspondence between the ink quantity of each color used in a printing device and the color component value of each color used in another image device. Similarly to the above description, the data maybe LUT or may be also-called profile containing matrices which defines relations between colors. Further, as inks used in a printing device, inks in four colors, CMYK, six colors, CMYKlclm, or more colors can be used. Therefore, in the other image device, colors only have to be defined by a less number of color components, for example, RGB, than the number of inks used in each printing device. A plurality of lattice points determined according to the present invention are used when correspondence definition data is created. For example, when each color component value defined in LUT is determined, colors defined by color components of individual lattice points are subjected to color measuring.

The ink quantity lattice point smoothness evaluation function and the lower-dimensional color lattice point smoothness evaluation function only have to be capable of evaluating the smoothness of the disposition of lattice points. Further, they only have to allow the positions of lattice points to be optimized by enhancing the evaluation values in the functions. Here again, the smoothness of disposition is defined as the degree of skewness in the arrangement of lattice points arranged in a space, as mentioned above. In general, the following can be said with respect to interpolative calculation of colors positioned between lattice points in a color space: the more orderly the lattice points are arranged, the better interpolation can be performed without great variation in interpolating accuracy depending on local positions in the space. Therefore, a specific number of the following lattice point positions can be determined by optimizing the lattice point positions according to the present invention: the lattice point positions are where color measuring or the like is performed when correspondence definition data is created and tone jump is less prone to occur throughout the color space.

Here again, needless to add, the ink quantity lattice point smoothness evaluation function or the lower-dimensional color lattice point smoothness evaluation function is not required to include only terms for evaluating the smoothness. That is, they are not required to include only terms whose value is increased when the smoothness is degraded. Similarly to the above description, in addition to the evaluation of smoothness, other various conditions may be added. In this sense, optimization according to the present invention is the optimization of the positions of lattice points in individual color spaces. These positions are such positions of lattice points that the smoothness in the color space and other various conditions are considered and these are brought into favorable state from a comprehensive standpoint.

According to the present invention, the lower-dimensional color space only has to be a space defined by a smaller number of color components than the number of inks used in the above printing device. For example, when four or more color inks are used in a printing device, the CMY color space, the RGB color space, the Lab color space, or the like can be adopted as the low-dimensional color space. (* is usually affixed to L, a, and b, respectively but it is omitted in this specification for simplicity. This is the same with the following description.) By enhancing evaluation in the ink quantity lattice point smoothness evaluation function and the lower-dimensional color lattice point smoothness evaluation function, the dispositions can be separately optimized. That is, the disposition of ink quantity lattice points and the disposition of lower-dimensional color lattice points can be separately optimized. Therefore, optimal positions can be individually determined without the constraint of the other's lattice point positions.

After this optimization, either optimized lattice points are maintained, and further, the other optimized lattice points are readjusted. Therefore, it is possible to keep the lattice points in at least either color space optimized and determine favorable lattice points in the other color space as well. Similarly to the above description, the readjustment can be made as follows: a matrix or the like which brings the lower-dimensional color lattice points and the ink quantity lattice points into correspondence with each other is defined. Thus, the relation between both the lattice points is maintained by the matrix. Then, the positions of the other lattice points are readjusted. Needless to add, there are cases wherewith either of a plurality of lattice points fixed, the other cannot be optimized. In such cases, it is not strictly required to fix either lattice points. That is, it is unnecessary to fix either with respect to all the lattice points. With respect to some lattice points, readjustment may be made with the movement thereof reduced as much as possible.

Further, according to the 10th aspect of the present invention, this readjustment is made so that ink quantity limitation will be met.

As mentioned above, the positions of lattice points are optimized by enhancing evaluation in the ink quantity lattice point smoothness evaluation function and the lower-dimensional color lattice point smoothness evaluation function. This constitution can be implemented in various ways. A third aspect of the present invention is so constituted that: the values of evaluation functions are increased with increase in the difference between the relative positional relation between two adjacent lattice points and the relative positional relation between other two adjacent lattice points. As a result, the optimal lattice point can be searched by minimizing these evaluation functions.

A fourth aspect of the present invention is another perfect example of the constitution wherein the difference between the relative positional relation between two lattice points and the relative positional relation between other two lattice points is considered. According to this aspect, two vectors are considered: one is the vector between adjacent lattice points containing a lattice point of interest. The other is the vector between adjacent lattice points containing a comparative lattice point. Then, the value obtained by dividing the differential vector between both the vectors by the distance between the lattice point of interest and the comparative lattice point is included in the components of the evaluation functions. In consideration of the operation of minimizing evaluation functions, the evaluation functions are preferably scalar functions. Therefore, such constitution that this component is raised to the second power or absolute values are used should be adopted. Further, by dividing the above differential vector by the distance between the lattice point of interest and the comparative lattice point, the smoothness of lattice point disposition can be standardized and incorporated into the functions. That is, when the distance between the lattice point of interest and the comparative lattice point is great, the difference in the relative positional relation to lattice points adjacent to these lattice points is supposed to be great. Therefore, the difference in relative positional relation is qualitatively incorporated into the evaluation functions by dividing the differential vector by the distance between the lattice point of interest and the comparative lattice point. As a result, the disposition of lattice points can be optimized by minimization of the evaluation functions.

As mentioned above, terms other than those for evaluating the smoothness of lattice point disposition can be incorporated into the ink quantity lattice point smoothness evaluation function and the lower-dimensional color lattice point smoothness evaluation function. A fifth aspect of the present invention is one example of this constitution. According to this aspect, a function whose value is increased as the lattice point of interest gets away from a specific position is included in the evaluation functions. With such an evaluation function, the lattice point of interest can be prevented from drastically moving from the specific position in the process of minimization of the evaluation function. In the process of minimization, the lattice point of interest is moved as appropriate. If this moving distance is great, the evaluation functions oscillate or diverge, and it is often difficult to converge them in the minimal value. To cope with this, measures are taken so that the farther the lattice point of interest gets away from a specific position, the more the values of evaluation functions are increased. Thus, a binding condition can be imposed so as to prevent the lattice point from drastically moving from the specific position.

Meanwhile, by defining the specific position based on various intentions, a binding condition reflecting the various intentions can be obtained. As an example, a case where the position of the lattice point of interest is shifted to minimize the evaluation functions and computation is performed to repeat this process of minimization by a plurality of times will be considered. In this case, the drastic movement of the lattice point of interest can be prevented by taking the position of the lattice point before movement as the specific position. If it is desired to impose such a condition as to prevent reduction in the color saturation of a color indicated by a lattice point in the process of minimization, there is no problem. The position which indicates the color equivalent to the color saturation of the color indicated by the position of the lattice point of interest is taken as the specific position. Thus, such a binding condition as to prevent the color saturation from being unnecessarily reduced can be imposed. For this binding condition, various conditions can be imposed. A binding condition based on the same intention may be imposed both on the ink quantity lattice point smoothness evaluation function and on the lower-dimensional color lattice point smoothness evaluation function. Or, binding conditions based on different intentions may be imposed.

A sixth aspect of the present invention is a concrete example of the constitution wherein a binding condition is imposed on evaluation functions. According to this aspect, a function whose value is increased as the color indicated by the lattice point of interest departs from a specific color is included in the evaluation functions. More specific description will be given. Each lattice point indicates a specific color in each color space. If minimizing evaluation functions is only considered, lattice point positions are shifted without reflecting the features of the color of each lattice point, and this results in change in colors. Needless to add, according to the present invention, lattice point positions are optimized while colors subtly are changed. With respect to some colors, it is unfavorable to freely shift lattice point positions to freely vary colors.

One example of such cases is lattice points which render gray by the three color components of CMY being substantially equivalent. With respect to such lattice points, if a specific color component is fluctuated just because evaluation functions are minimized, the color can depart from gray. In some cases, it is desired to store color component "0" with respect to a color wherein any one or two of three color components of CMY are "0." In these cases, such constitution that the evaluation functions are increased as the color indicated by each lattice point departs from a specific color can be adopted. Thus, it is possible to prevent the color from largely departing from the specific color and further optimize lattice point positions.

Further, there are cases where the color indicated by a lattice point is identified by a coordinate value which identifies the position of the lattice point; and furthermore, such a coordinate system that coordinate values cannot be negative in a color space is adopted. In this case, a function whose value is increased with increase in the absolute value of coordinate values, which are negative, is preferably included in the evaluation functions. However, in case of a function whose value is increased as the lattice point of interest gets away from a specific position, as mentioned above, the following conditions can be imposed: conditions practically equivalent to a function whose value is increased with increase in the absolute value of a coordinate value, which is negative. Needless to add, if the range of coordinates is limited in each coordinate system, the maximum value can exist in each coordinate value. Therefore, it is possible to include such a condition that the maximum value will not be exceeded in the evaluation functions. Here again, in case of a function whose value is increased as the lattice point gets away from a specific position, the following conditions can be imposed: conditions practically equivalent to a function whose value is increased as the coordinate value farther exceeds the maximum value of that coordinate system.

Various algorithms can be adopted for minimizing evaluation functions as mentioned above. One of perfect examples of this constitution is a seventh aspect of the present invention. According to this aspect, evaluation functions have color components constituting individual color spaces as variables. Therefore, by varying the values of the variables and further searching the minimal values of the evaluation functions, color component values as are minimized can be computed. As a result, lattice point positions in the minimized state can be determined.

When the evaluation of the smoothness of lattice point dispositions indicated by evaluation functions is enhanced, some lattice point position is shifted to search a position wherein the evaluation functions are minimized. According to the present invention, a deviation is added to each color component, and the lattice point is thereby considered to have been moved. Further, it is considered that the evaluation functions have been minimized with the deviation added. Thus, for example, by partially differentiating the evaluation function by each color component to compute the minimal value, a deviation which minimizes the evaluation function can be computed. By repeating this processing, the position of a lattice point converges in the optimal position, and thus the evaluation of the smoothness of disposition can be enhanced. Needless to add, according to the present invention, all the lattice points can be determined by repeating the same processing with respect to each lattice point. This is because according to the present invention, a plurality of lattice point positions are determined in color spaces.

Further, in minimization of evaluation functions, other various algorithms can be adopted. The following technique may be adopted: in an evaluation function which has each color component constituting a color space as a variable, the evaluation function is partially differentiated by each color component. Further, a color component which zeroes the partial differentiation value is computed. However, the above-mentioned technique to utilize deviations to determine lattice point positions has an advantage of enhanced convergeability. That is, by multiplying a deviation by a coefficient having a value of 0 to 1, the magnitude of the deviation can be adjusted, and the positions of lattice points are prevented from drastically shifting. As a result, in the above-mentioned process of minimization, evaluation functions can be prevented from oscillating or diverging. They can be made to promptly converge in the minimal value.

The above-mentioned lower-dimensional color space is smaller in number of color components than the ink quantity space. Therefore, in the lower-dimensional color space, it is easier to find the minimal values of evaluation functions. Since minimal values are easy to find, the following is preferably done in the above-mentioned readjustment: lattice points in the lower-dimensional color space are maintained, and lattice points in the ink quantity space are readjusted. When this constitution is adopted, it can be taken into account that lattice points in the ink quantity space are readjusted. Thus, the above-mentioned minimization utilizing deviations may be applied only to optimization of the positions of lattice points in the lower-dimensional color space.

According to the present invention, either of optimized ink quantity lattice points and lower-dimensional lattice points is maintained, and the other is readjusted. Thereby, the above-mentioned correspondence definition data wherein the optimized lattice points are contained, and further, the lower-dimensional lattice points and the ink quantity lattice points are in correspondence with each other is created. A perfect example of the constitution for this purpose is an eighth aspect of the present invention. According to this aspect, the above-mentioned lower-dimensional color lattice points are substantially maintained, and further, the ink quantity lattice points are readjusted. Further, when readjustment is made, a binding condition is imposed so that both the lattice points can be brought into correspondence with each other by a predetermined transformation expression. Therefore, lattice points independently optimized by separate evaluation functions are provided with predetermined correspondence after readjustment. Though color matching, such as color measuring, is not performed, correspondence definition data wherein colors in both the color spaces are in correspondence with each other and optimally disposed lattice points are contained can be determined.

At this time, various transformation expressions can be adopted for the predetermined transformation expression. For example, matrices can be adopted. A case where the number of ink colors is 6 and the color components in the lower-dimensional color space are in three colors will be considered. In this case, the ink quantity lattice points can be converted into the lower-dimensional color lattice points by converting six colors into the three colors by a 3×6 matrix. With respect to transformation expressions, conversion from multiple dimensions into lower dimensions is preferable because univocal relation can be more easily defined by this conversion. More specific description will be given. When a color is identified in the lower-dimensional color space, there are many lattice points indicating substantially the same color in the multi-dimensional color space. However, if a color is identified in the multi-dimensional color space, there is usually only one lattice point indicating substantially the same color in the lower-dimensional color space. In this case, the matrix can be determined with ease.

Further, a case where the above-mentioned readjustment with a binding condition imposed will be considered. Similarly to the above-mentioned description, there are cases where it is unfavorable to maintain the positions of lower-dimensional color lattice points with conformity with various conditions taken into account. In such cases as well, it is not indispensable to maintain the positions of lower-dimensional color lattice points. That is, lower-dimensional color lattice points can be fixed as much as possible, and further, the positions of ink quantity lattice points can be moved.

An 11th aspect of the present invention is a perfect example of the constitution related to the above-readjustment. According to this aspect, a first movement evaluation function is defined. This function includes a function whose value is increased with increase in the distance between the readjusted lattice point and the other optimized lattice point. That is, by minimizing this first movement evaluation function, the movement can be reduced as much as possible when the other optimized lattice point is readjusted. As a result, such lattice point positions as described below can be determined: lattice point positions wherein the movement of optimized lattice points is reduced as much as possible; predetermined correspondence can be provided between ink quantity lattice points and lower-dimensional color lattice points; and further, ink quantity limitation is also taken into account.

Various conditions to be considered when ink is made to adhere to a printing medium can be taken into account as ink quantity limitation. One of examples of the constitution is a 12th aspect of the present invention. According to this aspect, limitation on the maximum quantity of ink adhering to a specific printing area is taken into account when the above-mentioned readjustment is made. More specific description will be given. If ink is excessively made to adhere to a printing medium, troubles, such as ink's flowing after printing, occur. Therefore, in general, the quantity of ink which can be made to adhere to a specific area is limited. Consequently, the above-mentioned other optimized lattice points are moved with this limitation taken into account. Thus, lattice point positions with ink quantity limitation also taken into account can be determined.

As a result, with correspondence definition data eventually created, such color conversion that inks are discharged against ink quantity limitation can be prevented from being carried out. At this time, limitation on the quantity of ink adhering to a printing medium only has to be taken as a condition. Various areas can be adopted as the above specific printing area. If limitation is imposed on ink quantity discharged per pixel in image data, for example, the area equivalent to one pixel corresponds to the specific area.

Various constitutions can be adopted as the concrete constitution for defining the maximum quantity of ink adhering. One example of such constitutions is a 13th aspect of the present invention. According to this aspect, computation is made by adding the product of a weighting factor whose value is "0" or "1" defined for each ink quantity component value and each component value of the ink quantity lattice points. More specific description will be given. By adding an ink quantity defined by each component value at each ink quantity lattice point, the quantity of ink consumed for a certain pixel can be determined. However, processing related to the present invention is preferably automatized by a computer. In this case, conditions are preferably described by a universal method which can express all the cases.

Accordingly, an ink quantity is determined by multiplication of a coefficient which can take "0" or "1" as a weighting factor by an ink quantity component value, and the ink quantity is thereby formulated. Thus, with respect to a combination of arbitrary ink quantity component values, a condition can be defined with ease. If a condition is formulated, the first movement evaluation function can be easily minimized with the ink quantity limitation taken into account by taking the conditional expression as a binding condition.

Further, another limitation can be imposed on ink quantity as in a 14th aspect of the present invention. According to this aspect, limitation is imposed on the quantity of specific color ink consumed at a specific gradation value. More specific description will be given. If a specific color ink is used for a specific color, the drops of the specific color ink can be conspicuous in the print result, which can give grainy appearance. To cope with this, limitation is imposed on use of the specific color ink in some cases. For example, if high-density K ink is used when light colors are used to render colors of high lightness, that is prone to give grainy appearance.

In this case, by imposing limitation to prevent use of K ink for specific colors, the production of grainy appearance can be prevented. Achromatic colors rendered by K ink can be alternatively rendered by a combination of CMY inks or other means. Therefore, the constitution with limitation on K ink is especially favorable.

Various constitutions can be adopted as a concrete constitution for defining limitation on the quantity of specific color ink consumed. One example of such constitutions is a 15th aspect of the present invention. According to this aspect, the limitation is imposed on condition that the product of a weighting factor whose value is "0" or "1" defined for each ink quantity component value and each component value of the ink quantity lattice points is zeroed. More specific description will be given. When the weighting factor which takes the value of "0" or "1" is multiplied by an ink quantity component value, the result takes the value of "0" or another value. To limit use of a specific color ink, the value of that ink quantity color component should be "0" or a value close thereto. To impose a condition that the ink quantity component value is zeroed, "1" can be taken as the weighting factor for the ink quantity component value. This is because, to satisfy the condition that the above product is zero, the ink quantity component value must be "0."

Processing related to the present invention is preferably automated by a computer. Thus, conditions can be described by a universal method whereby all the cases can be expressed by defining a condition as mentioned above. Therefore, the automatization by computer is favorable. By formulating conditions as mentioned above, the first movement evaluation function can be easily minimized with ink quantity limitation taken into account.

In readjustment, either of optimized lattice points is maintained, and the other optimized lattice point positions are moved as a rule. However, there are cases where, because either of the optimized lattice points is maintained, the other optimized lattice point positions cannot be converged. In such cases, maintaining either lattice point positions is not always indispensable, and such a constitution as according to a 16th aspect of the present invention is possible. More specific description will be given. There are cases where, when either of optimized lattice point positions is maintained, a solution which minimizes the first movement evaluation function does not exist. In such cases, shifting of the positions of the either optimized lattice points is permitted.

Further, a second movement evaluation function is defined. The second movement evaluation function includes a function whose value is increased with increase in the distance between the readjusted lattice point and the other optimized lattice point and further increased with increase in the moving distance of the either optimized lattice point. If the second movement evaluation function is minimized with this constitution, the either optimized lattice point is also moved. Therefore, a lattice point position wherein the position of the other optimized lattice point does not diverge or oscillate and the evaluation function converges in the minimal value can be determined.

One example of constitutions suitable for defining the second movement evaluation function is a 17th aspect of the present invention. More specific description will be given. There are cases where it is undesired to freely move both the either optimized lattice point and the other optimized lattice point by the same movement. An example is a case where it is desired to maintain the positions of the either optimized lattice points as much as possible. In this case, the likelihood of moving of both the lattice points can be controlled by taking the following measure: a function is defined so that the unit fluctuation of the either optimized lattice point more greatly contributes to increase in the value of the second movement evaluation function than the unit fluctuation of the other optimized lattice point.

More specific description will be given. The fluctuations of both the lattice points increase the value of the second movement evaluation function. Therefore, when the second movement evaluation function is minimized, the lattice points are moved so that the amounts of fluctuations of both the lattice points will be reduced as much as possible. If either's contribution and the other's contribution are different from each other, one that makes a greater contribution more largely increases the second movement evaluation function by slight fluctuation. Therefore, in the process of minimizing the second movement evaluation function, the movement is conversely suppressed.

Various constitutions can be adopted to adjust contribution of each lattice point making unit fluctuation. One example of the constitutions is such that a term comprising the difference between the vector before moving and the vector after moving of each lattice point and a weighting factor is incorporated into the second movement evaluation function. This constitution is created so that the weighting factor for vector difference with respect to either optimized lattice point will have a greater absolute value.

Another example of constitutions suitable for defining the second movement evaluation function is an 18th aspect of the present invention. More specific description will be given. There are cases where it is undesired to allow the color corresponding to the lattice point of interest to be greatly fluctuated by fluctuation in the component values of individual lattice points. When the component values of individual lattice points are compared, the magnitude of the absolute values of component values is disregarded with respect to the second movement evaluation function. Then, contribution at the same level is given thereto. Thus, the likelihood of moving of each component is brought to the same level. However, even in case of the same amount of fluctuation, component values having a small absolute value and those having a large absolute value are different in their influences on colors. The unit fluctuation of component values having a small absolute value has greater influences on colors.

Accordingly, components having a small absolute value are so constituted that they make a relatively great contribution to the value of the second movement evaluation function as compared with components having a large absolute value. As a result, the degrees of fluctuation in colors indicated by individual lattice point caused by fluctuation of individual component values can be averaged. Further, the influences exercised on colors by fluctuation of individual components can be averaged, and further, the second movement evaluation function can be minimized. Various constitutions can be adopted to relatively change the degree of contribution of each component. For example, a term obtained by multiplying each component of the either optimized lattice points by a weighting factor is incorporated in the second movement evaluation function. Further, such a constitution that the weighting factors of individual components are the reciprocal numbers of respective component values. Thus, contribution from each component can be uniformized.

Once lattice points for correspondence definition data creation are determined, colors outputted by a printer in ink quantities determined by the lattice points for correspondence definition data creation can be subjected to color measuring. Further, the ink quantities can be brought into correspondence with colors used in another image device by that color measuring value. As a result, LUTs and profiles which make tone jump less prone to occur throughout color spaces can be created. When colors used an image device other than printers are converted into ink quantities which define colors used in the printer, these LUTs or profiles can be used. Thus, color conversion can be carried out throughout color spaces without the occurrence of tone jump.

Therefore, it can be said that processors and the like utilizing these LUTs or profiles utilize the technical philosophy of the present invention. More specifically, the present invention remains effective as a substantive image processor like a 19th or 22nd aspect of the present invention. The present invention is also effective as a substantive image processing method like a 20th or 23rd aspect of the present invention. Such an image processor or image processing method can be solely implemented, or can be incorporated into some equipment and implemented together with another apparatus or method. Thus, the philosophy of the present invention is not limited to these aspects but can be implemented in various embodiments. The embodiments of the present invention can be modified as appropriate, and the present invention may be embodied in software or in hardware.

If the philosophy of the present invention is embodied in software for implementing an image processor or image processing method, the philosophy of course exists on a recording medium with such software recorded thereon. The philosophy is utilized in such a form. Therefore, the present invention can be embodied as a medium with an image processing program recorded thereon like a 21st or 24th aspect of the present invention. Needless to add, the recording medium may be a magnetic recording medium or a magneto-optic recording medium, and this is the same with any recording medium that will be developed in the future. Also, this is completely the same with the phases of reproduction, such as primary duplicate copies and secondary duplicate copies, completely without question.

Even if a communication line is used as a method for supply, there is no difference in that the present invention is utilized. If the present invention is embodied partly in software and partly in hardware, that is completely the same in the philosophy of invention. Such an embodiment that part of the program is stored on a recording medium and read in as required may be adopted. Or, all the functions need not necessarily be implemented in the program itself, but some functions may be implemented by an external program or the like. This is because even in this case, every function only has to be capable of being implemented by a computer. The above-mentioned lattice point determining method for correspondence definition data creation holds as an invention. Therefore, needles to add, apparatuses and programs for implementing the method also hold as the invention.

DESCRIPTION OF THE PREFERRED EMBODIMENTS

Figure 1:
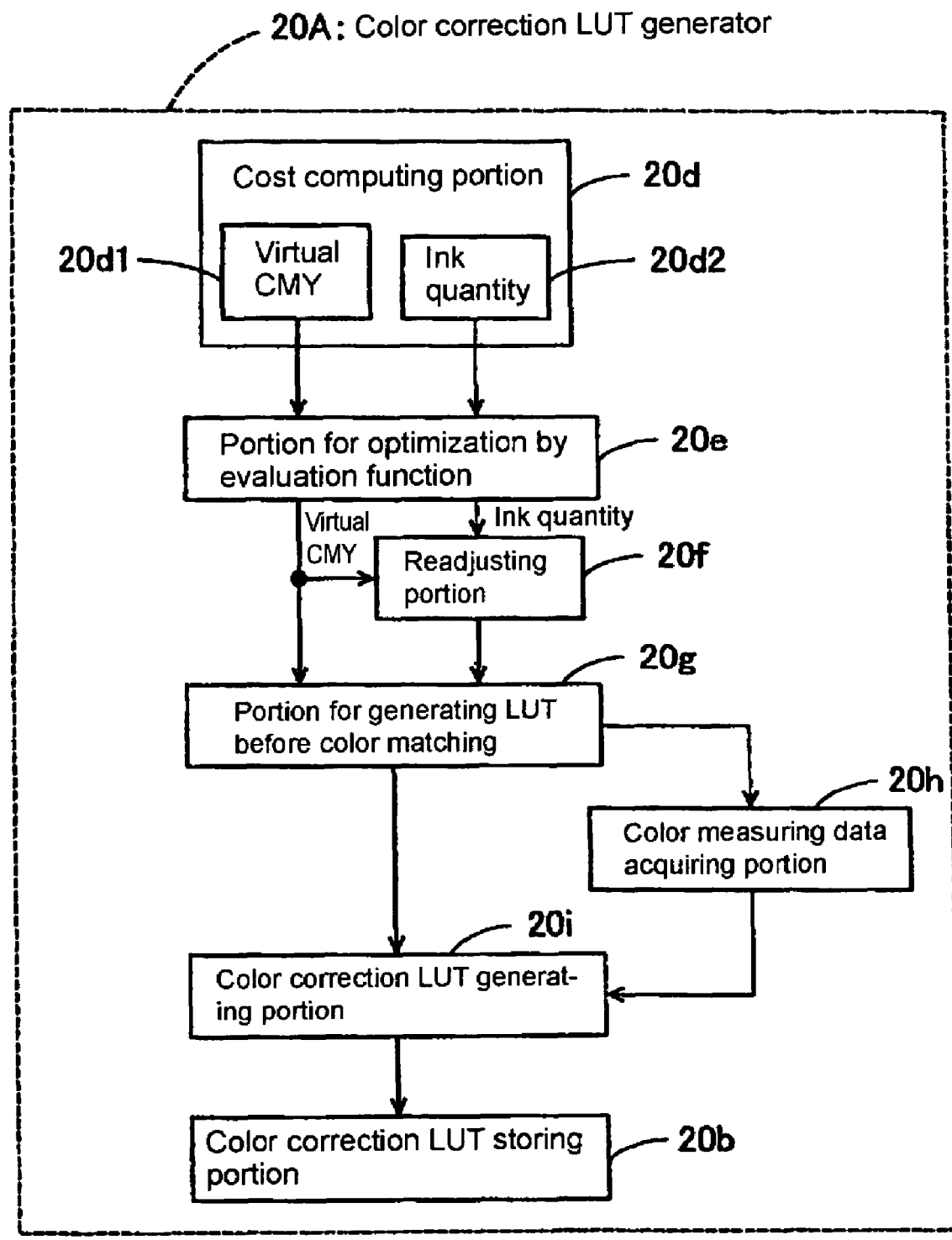
FIG. 1 is a functional block diagram of a color correction LUT generator.

Here, embodiments of the present invention will be described in the following order:
(1) Constitution of the Present Invention:
(2) Image Processor:
(3) Image Processing Control Program:
(4) Color Correction LUT Generator:
(5) Optimization by CMY Lattice Point Evaluation Function:
(5-1) Cost Estpn:
(5-2) Cost Esopn:
(5-3) Cost Esapn:
(5-4) Computation of Vector Which Gives Minimal Value:
(6) Optimization by Ink Quantity Lattice Point Evaluation Function:
(6-1) Cost Eitpn:
(6-2) Cost Eiopn:
(6-3) Computation of Vector Which Gives Minimal Value:
(7) Readjustment Processing:
(8) Other Embodiments:

(1) Constitution of the Present Invention:

FIG. 1 is a functional block diagram of a color correction LUT generator. The generator utilizes the lattice point determining method for correspondence definition data creation in an embodiment of the present invention to generate color correction LUTs. The color correction LUT generator 20A illustrated in the figure performs color measuring on colors indicated by lattice points for correspondence definition data creation determined by the lattice point determining method for correspondence definition data creation of the present invention. Then, the generator 20A determines correspondence between sRGB data and CMYKlclm data based on the color measuring values. The thus determined correspondence is defined in color correction LUTs, which are utilized when color conversion is carried out in image processing.

Figure 2:
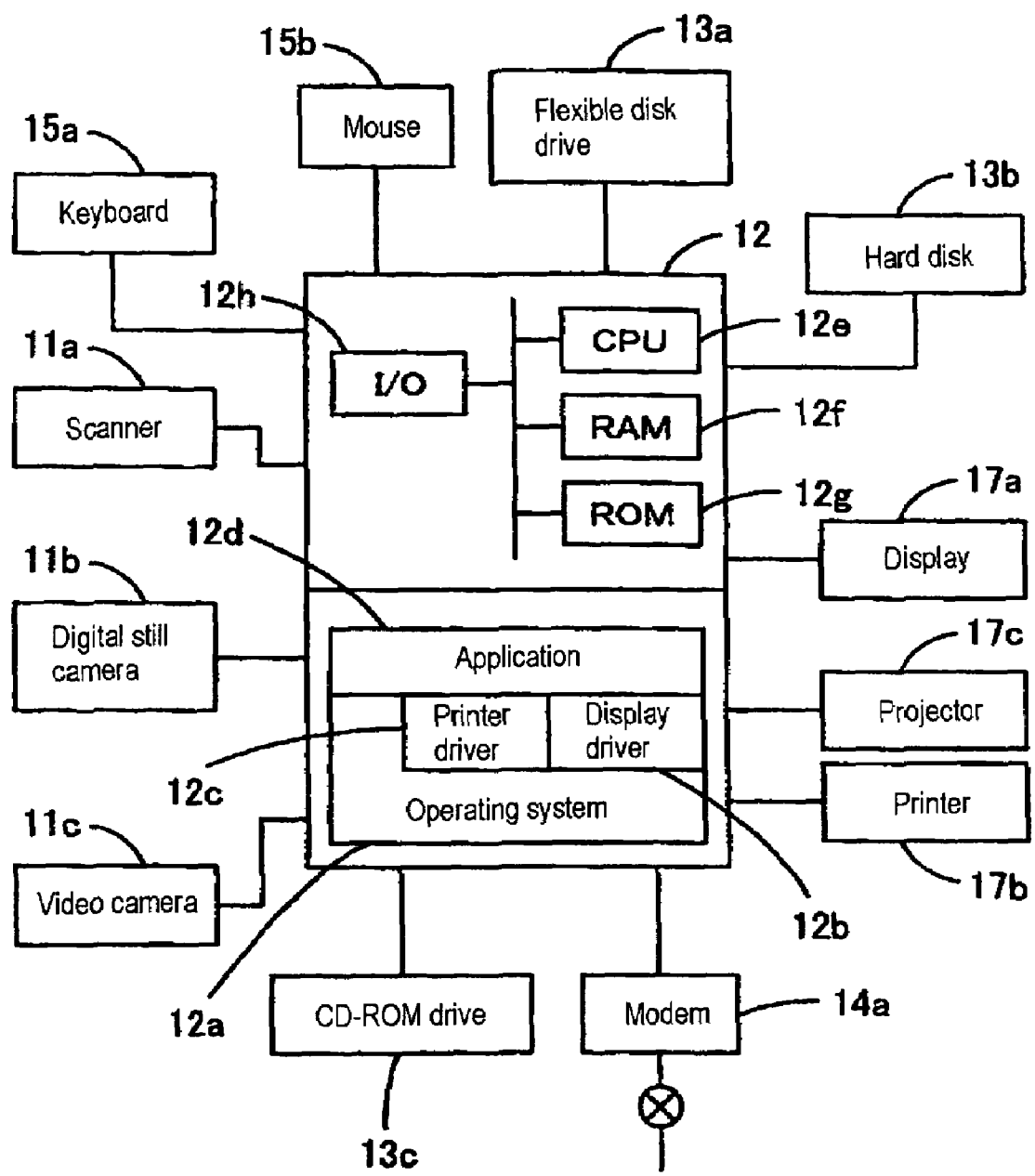
FIG. 2 is a block diagram schematically illustrating an example of the hardware configuration of the color correction LUT generator and the image processor.
Figure 3:
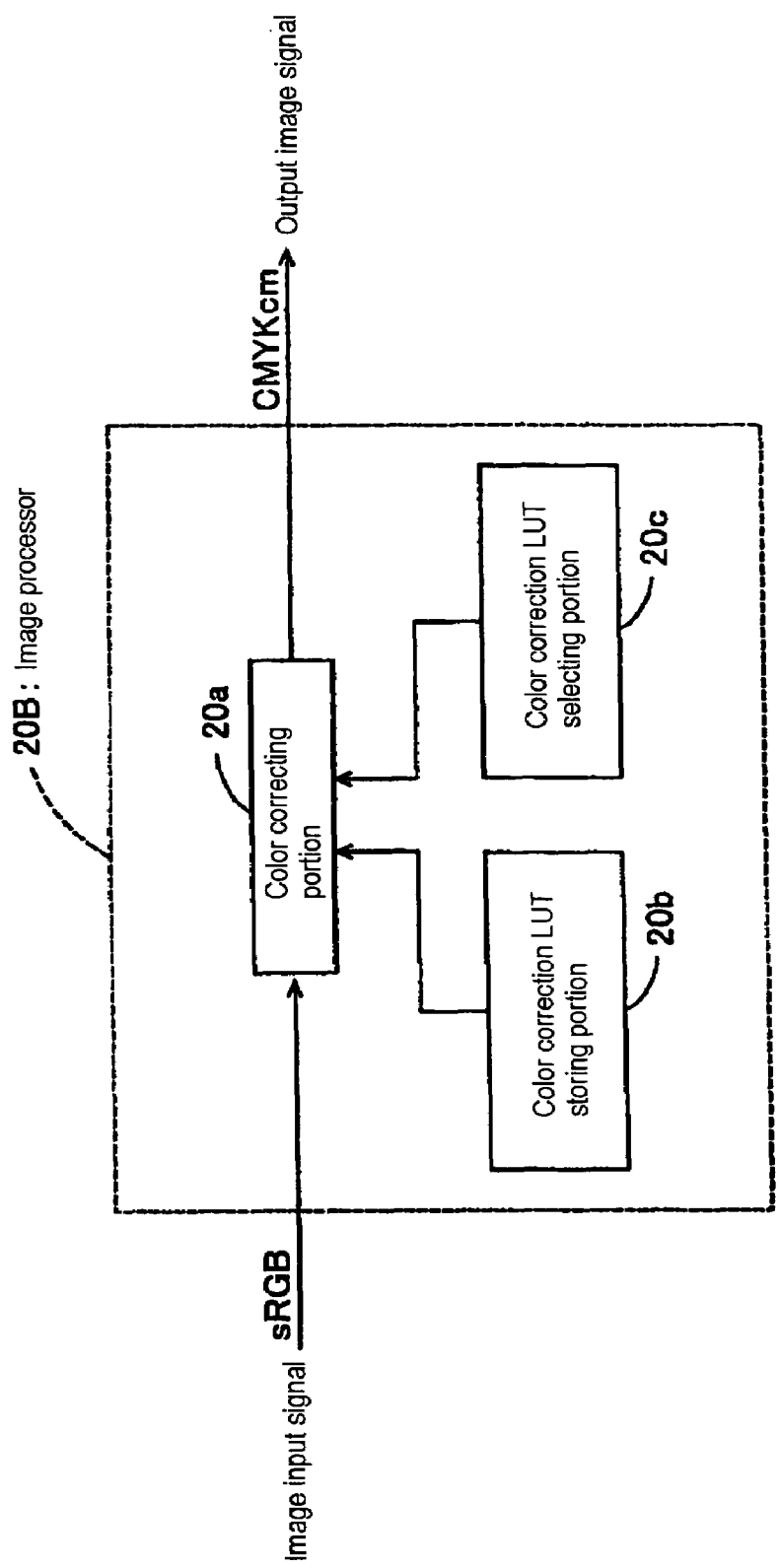
FIG. 3 is a functional block diagram of the image processor.

FIG. 3 is a functional block diagram of the image processor in the embodiment of the present invention. That is, the image processor is a device for carrying out color conversion using color correction LUTs generated by the color correction LUT generator 20A. FIG. 2 is a block diagram schematically illustrating an example of the hardware configuration of the color correction LUT generator and the image processor. In this embodiment, a computer system is adopted as an example of hardware which embodies the color correction LUT generator and the image processor.

FIG. 2 illustrates this computer system in the form of block diagram. The computer system comprises a scanner 11a, a digital still camera 11b, and a video camera 11c as image input devices, which are connected with a main unit 12. These input devices are capable of displaying image data, which represents images in a dot (pixel) matrix, in 256 shades of gray in three primary colors of RGB. The input devices are respectively capable of thereby rendering approximately 16.7 million colors.

The main unit 12 is connected with a flexible disk drive 13a, a hard disk 13b, and a CD-ROM drive 13C as external auxiliary storages. Major programs related to the system are recorded on the hard disk 13b, and required programs and the like can be read out of a flexible disk, CD-ROM, or the like as required. In addition, the main unit 12 is connected with a modem 14a as a communication device for connecting the main unit to an external network or the like. When the main unit 12 is connected to an external network through a public network, software and data can be downloaded and introduced therein. In this example, the computer system is so constituted that external access is made over telephone line by the modem 14a. However, such a constitution that access to a network is made through a LAN adaptor can be adopted. In addition to the forgoing, a keyboard 15a and a mouse 15b are connected for operating the main unit 12.

Further, the computer system comprises a display 17a, a color printer 17b, and a projector 17c as image output devices. The display 17a is provided with a display area of 800 pixels in the horizontal direction by 600 pixels in the vertical direction. The display 17 is capable of displaying the above-mentioned 16.7 million colors at each pixel. This resolution is illustrative only, and may be modified to 640×480 pixels, 1024×768 pixels, or the like as appropriate.

The color printer 17*b* is an ink jet printer, and is capable of jetting dots onto paper for printing as media using six color inks of CMYKlclm and thereby printing images. With respect to pixel density, the printer 17*b* is capable of performing as high-density printing as 360×360 dpi or 720×720 dpi. However, with respect to rendering with gradation, the printer 17*b* prints images in two shades of gray, that is, based on whether to apply color ink or not. While an image is inputted using such an image input device, it is displayed on or outputted to an image output device. Therefore, predetermined programs are executed in the main unit 12.

Of these programs, an operating system (OS) 12*a* runs as the primary program. The operating system 12*a* has various drivers built therein: a display driver 12*b* which causes the display 17*a* to display images; a printer driver 12*c* which causes the color printer 17*b* to produce printout; and a projector driver 12*i* (not shown) which causes the projector 17*c* to produce a display. These drivers 12*b*, 12*c*, and 12*i* depend on the kind of the display 17*a*, the color printer 17*b*, and the projector 17*c*, and can be added to the operating system 12*a* according to the respective kind. Further, the drivers are capable of carrying out additional functions above the standard in dependence on the kind of equipment. That is, a common processing system can be maintained on the standard system of the operating system 12*a*, and varied processing can be additionally carried out within the allowable range.

As the basis for executing these programs, the main unit 12 comprises CPU 12*e*, RAM 12*f*, ROM 12*g*, I/O 12*h*, and the like. The CPU 12*e* which performs computation uses the RAM 12*f* as a temporary work area, setting storage area, or program area, and further, executes the primary program written in the RAM 12*f* as appropriate. Thus, the CPU 12*e* controls external or internal equipment connected through the I/O 12*h*.

At this time, applications 12*d* are executed on the operating system 12*a* as the primary program. The details of processing performed by applications 12*d* vary from one application to another. For example, some monitors the operation of the keyboard 15*a* or the mouse 15*b* as an operating device. When these operating devices are operated, some appropriately controls varied external equipment and performs corresponding processing. Further, some displays the result of processing on the display 17*a* or outputs it to the color printer 17*b*.

In such a computer system, image data can be acquired by the scanner 11*a* or the like as an image input device, and it can be subjected to predetermine image processing by applications 12*d*. Then, the result of processing can be displayed on or outputted to the display 17*a*, the color printer 17*b*, or the projector 17*c* as an image output device.

In this embodiment, the image processor is implemented as a computer system. However, such a computer system is not always required. The image processor only has to be a system which is capable of subjecting similar image data to image processing according to the present invention. For example, such a system that an image processor which performs image processing according to the present invention is built in a digital still camera is acceptable. In this case, a color printer is caused to produce printout using the processed image data.

Further, a color printer which is fed with image data without intervention of a computer system and prints it may be so constituted that: image data inputted through a scanner, a digital still camera, a modem, or the like is automatically subjected to image processing according to the present invention, and then printing processing is performed. In addition, the present invention is of course applicable to varied equipment, such as a color facsimile machine, a color copy machine, and a projector, which handles image data.

(2) Image Processor:

Next, processing performed when the computer system 12 is caused to function as an image processor of the present invention will be described. In the computer system 12, the input images of the scanner 11*a*, the digital still camera 11*b*, and the video camera 11*c* and the output images of the display 17*a* and the projector 17*c* can be printed on the printer 17*b*. In this image printing, processing utilizing color correction LUTs is performed.

More specific description will be given. It is assumed that the same image is handled on different image devices, for example, on an image input device and on an image output device. If in image data used in the respective image devices, the colors at individual pixels are rendered in different color spaces, color conversion is carried out referring to color correction LUTs. At this time, color correction LUTs generated by the color correction LUT generator 20A are referred to. In this embodiment, the image input devices, the display 17*a*, and the projector 17*c* use sRGB data, and the printer 17*b* uses CMYKlclm data. Both types of data are brought into correspondence with each other by referring to color correction LUTs. According to this embodiment, this processing is performed by the printer driver 12*c*. In other words, the computer system 12 on which the printer driver 12*c* is executed functions as an image processor according to the present invention.

In FIG. 3, the image processor 20B subjects sRGB image input data to color conversion processing, and outputs CMYKlclm image output data as an output image signal. Each image data is obtained by color-separating color images into predetermined color components, and indicates the intensity of each color component. Individual color components are chromatic colors, and render an achromatic color, typified by gray, black, or white when mixed at a predetermined ratio.

Figure 4:
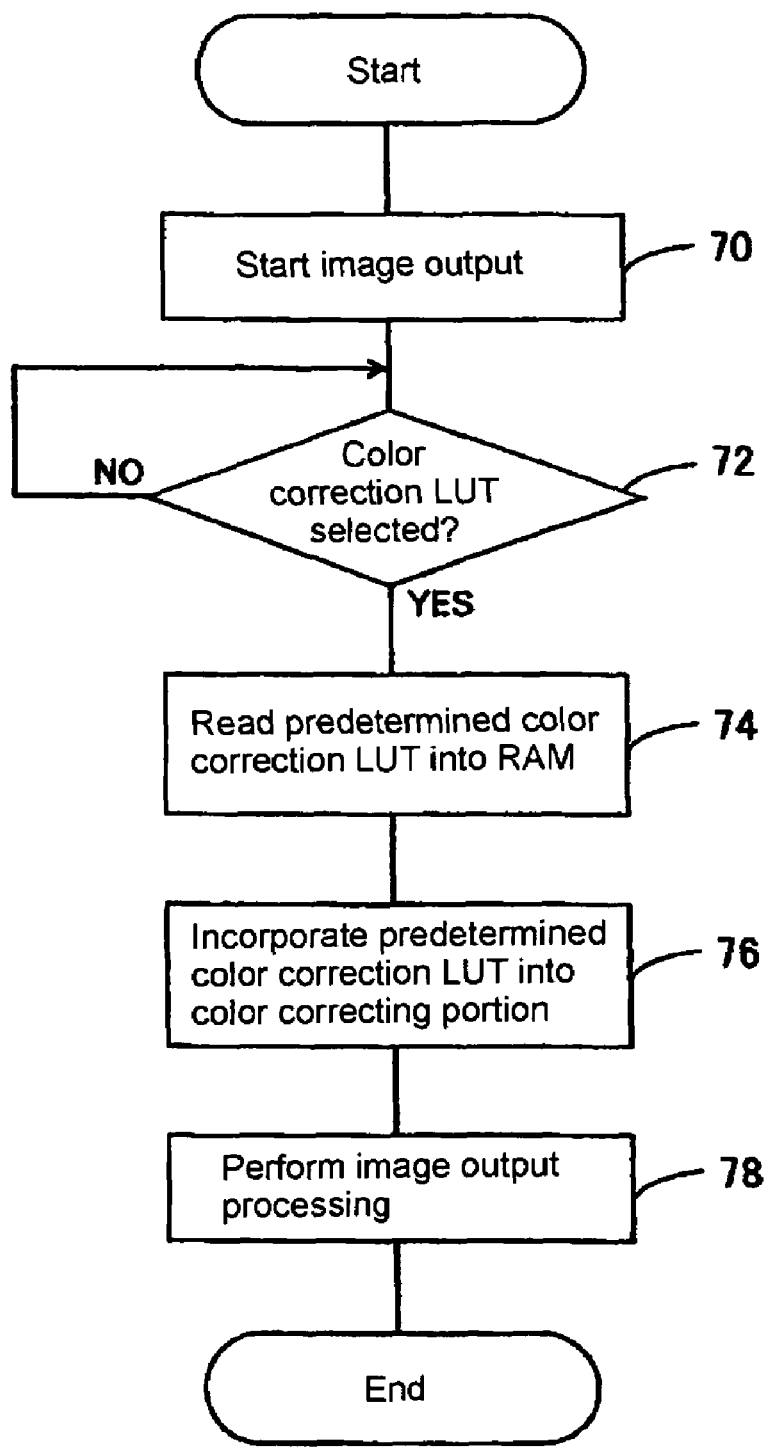
FIG. 4 is a flowchart illustrating color conversion processing.

The image processor 20B comprises a color correction LUT storing portion 20*b* which, at least, stores color correction LUTs generated by the color correction LUT generator 20A; and a color correcting portion 20*a* which reads a color correction LUT selected by a color correction LUT selecting portion 20*c* out of the color correction LUT storing portion 20*b* and converts sRGB data into CMYKlclm data referring to the color correction LUT read out. Provided with this configuration, the image processor 20B performs the above-mentioned color conversion processing in accordance with the flow illustrated in FIG. 4. The user is supposed to operate the keyboard 15*a* or the like to give an instruction to print the image. In response to the instruction, image output is stated (Step 70).

When image output is started, a predetermined color correction LUT to be referred to when the image of interest is printed is selected. That is, a plurality of color correction LUTs are provided beforehand in correspondence with the type of inks and a medium used in the printer 17*b* and the like. Then, when color conversion processing is performed, an appropriate color correction LUT is selected. This embodiment is also so constituted that an appropriate color correction LUT is selected and utilized. In case of this embodiment, one of these color correction LUTs is the color correction LUT generated by the color correction LUT generator 20A.

When the predetermined color correction LUT is selected (Step 72, YES), that color correction LUT is read out of the color correction LUT storing portion 20*b* and into the RAM 12*f* (Step 74). Then, the color correction LUT is incorporated into the color correcting portion 20*a* (Step 76). Image processing is performed by interpolation referring to the three-dimensional color correction LUT, and image output processing is performed (Step 78). That is, CMYKlclm image output data is obtained. The printer driver 12*c* further processes this CMYKlclm image output data, and performs the print operation.

More specifically, using this CMYKlclm image output data, half tone processing, rasterizing processing, and the like are performed, and print data to be sent out to the printer 17*b* is generated in the end. When the generated print data is sent out to the printer 17*b*, the printer 17*b* performs the print operation based on the print data. The color correction LUT according to the present invention is created based on the result of color measuring with respect to lattice points smoothed as described later. As a result, a color correction LUT which enables highly accurate color conversion throughout color spaces can be created. Thus, a print result without occurrences of tone jump throughout the color spaces can be obtained.

With the color correction LUT in this embodiment, pieces of image data in different color spaces can be brought into correspondence with each other. Further, image data of an arbitrary color can be computed by interpolation from a plurality of representative colors defined in the color correction LUT. Therefore, color spaces which are brought into correspondence with each other by the color correction LUT are not limited to sRGB or CMYKlclm mentioned above. Various embodiments, such as correspondence between equipment-specific RGB colors and CMYKlclm colors, can be adopted.

(3) Image Processing Control Program:

When the printer driver 12*c* is executed with the above-mentioned hardware configuration, the computer system 12 in this embodiment thereby functions as an image processor. Therefore, modules which perform image processing in the printer driver 12*c* constitute the image processing control program according to the present invention. This image processing control program is usually recorded on a recording medium, such as flexible disk and CD-ROM, in a computer 12-readable manner, and distributed. The program is read by a media reader (e.g. CD-ROM drive 13*c*, flexible disk drive 13*a*, etc.) and is installed in the hard disk 13*b*. Then, the CPU 12*e* reads required programs from the hard disk 13*b* and performs required processing.

Figure 5:
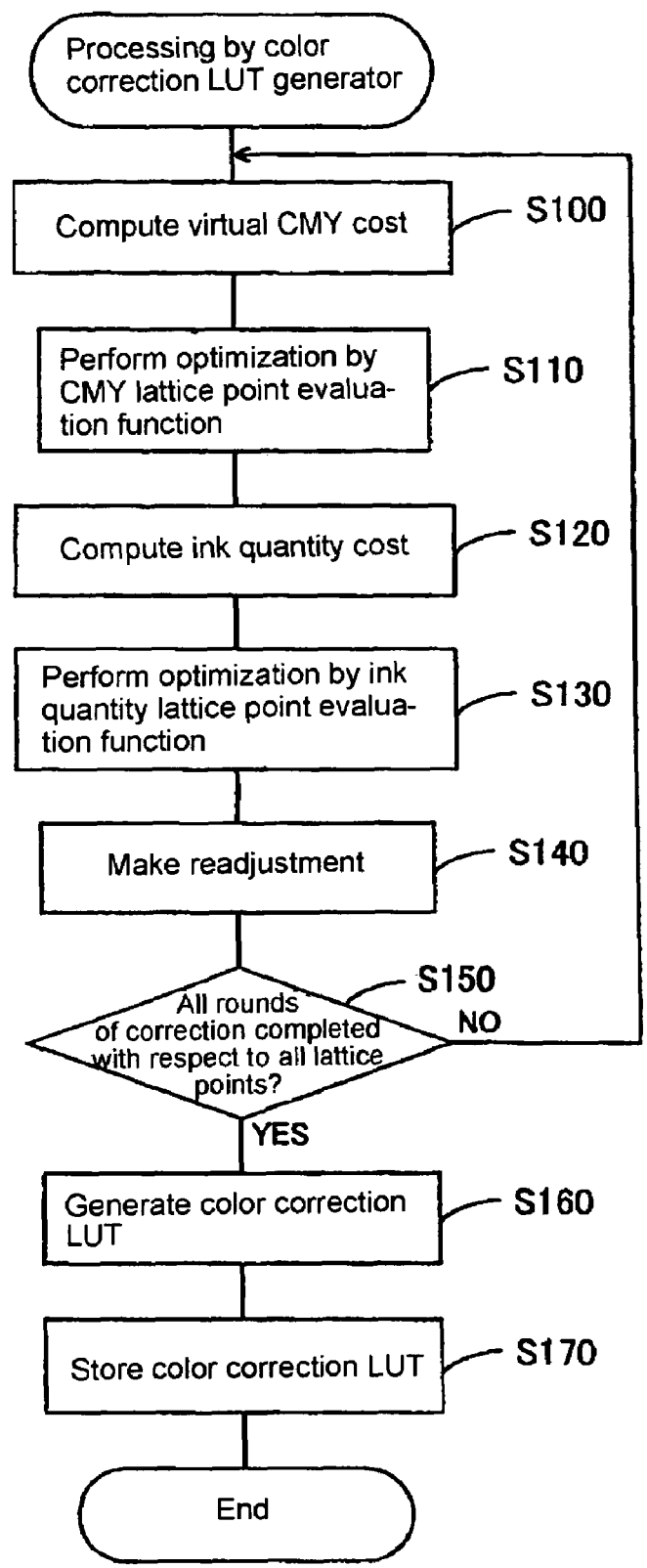
FIG. 5 is a flowchart schematically illustrating the processing in the color correction LUT generator.

(4) Color Correction LUT Generator:

Next, processing performed by the color correction LUT generator 20A will be described in detail. As illustrated in FIG. 1, the color correction LUT generator 20A comprises a cost computing portion 20*d*; a portion 20*e* for optimization by evaluation function; a readjusting portion 20*f*; a portion 20*g* for generating LUT before color matching; a color measuring data acquiring portion 20*h*; a color correction LUT generating portion 20*i*; and the color correction LUT storing portion 20*b*. FIG. 5 schematically illustrates the flow of processing in the color correction LUT generator 20A. The cost computing portion 20*d* computes terms contained in the CMY lattice point evaluation function and the ink quantity lattice point evaluation function.

The ink quantity lattice point smoothness evaluation function is a function for evaluating the smoothness of the disposition of ink quantity lattice points whose component is the quantity of each color ink. The color ink quantities are values which specify the quantities of six color inks provided and consumed in the printer 17*b*. In this embodiment, the quantities consumed are expressed in 256 (0 to 255) shades of gray. Therefore, a six-dimensional space whose components are the quantities of these six color inks can be considered. In this embodiment, this six-dimensional space is referred to as "ink quantity space." In the ink quantity space as well, if an ink quantity is defined, the position in the space is identified, and that point can be taken as a lattice point.

The CMY lattice point evaluation function is a function for evaluating the smoothness of the disposition of CMY lattice points defined by the color components of CMY. Each component value of the CMY lattice points can be calculated by multiplying a column vector whose elements are the six components of the above ink quantities by a predetermined matrix with 3 rows and 6 columns. Further, by subtracting each component value of CMY lattice points from the value of a constant, they can be virtually brought into one-to-one correspondence with the color components of RGB. These CMY components will be referred to as "virtual CMY," and the color space defined by the CMY components will be referred to as "virtual CMY space." In consideration of the virtual CMY space, when the respective values of CMY components are defined, their positions in the virtual CMY space can be identified, and these points can be taken as lattice points.

As mentioned above, the virtual CMY can be brought into one-to-one correspondence with the respective color components of RGB only by increasing or decreasing the constant. If the lattice point disposition is less screwed in the virtual CMY space, the skewness in the lattice point disposition is reduced in the RGB color space as well. Therefore, by optimizing the lattice point disposition in the virtual CMY space, it is guaranteed that the skewness in the lattice point disposition in the RGB color space is reduced. Therefore, these lattice points are suitable for creating color correction LUTs which define correspondence between sRGB image data and CMYKlclm image data as in this embodiment. The ink quantity space is six-dimensional and the virtual CMY space is three-dimensional. Therefore, when compared with the ink quantity space, the virtual CMY space is the lower-dimensional color space.

As mentioned above, the ink quantity lattice point smoothness evaluation function and the CMY lattice point smoothness evaluation function are functions for evaluating the smoothness of the disposition of lattice points in the respective color spaces. Also, they are functions which optimize the positions of lattice points by minimization of the respective functions. Therefore, each term in these functions is a function whose value is reduced as the disposition of lattice points is smoothed. This is referred to as "cost." The cost computing portion 20*d* is capable of separately computing the costs 20*d*1 in the CMY lattice point evaluation function and the costs 20*d*2 in the ink quantity lattice point evaluation function. When the cost computing portion 20*d* computes the costs in the individual functions, the CMY lattice point evaluation function and the ink quantity lattice point evaluation function are determined by the sum thereof.

The portion 20*e* for optimization by evaluation function utilizes the determined CMY lattice point evaluation function and ink quantity lattice point evaluation function to optimize the lattice point positions in the respective color spaces. More specifically, the portion 20*e* computes the minimal solution of each evaluation function, and defines the lattice point position wherein the minimal solution is given as the optimal lattice point position. The portion 20*e* for optimization by evaluation function separately utilizes the individual evaluation functions to optimize the lattice point positions in the respective color spaces. Various algorithms can be adopted as the algorithm for computing the minimal solution. Different algorithms may be adopted for the CMY lattice point evaluation function and for the ink quantity lattice point evaluation function. Or, the same algorithm may be adopted for both the functions. If it is required that either lattice point position should be optimized more accurately, an algorithm which allows either to be optimized more accurately can be adopted.

According to the present invention, the calculation of costs and the optimization of evaluation functions are individually performed with respect to each color space, as mentioned above. In this embodiment, this is implemented at Step 100 to Step 130 in FIG. 5. More specifically, at Step 100, the cost computing portion 20d computes costs with respect to the virtual CMY space. At Step 110, the portion 20e for optimization by evaluation function performs optimization by the CMY lattice point evaluation function. Further, at Step 120, the cost computing portion 20d computes costs with respect to the ink quantity space. At Step 130, the portion 20e for optimization by evaluation function performs optimization by the ink quantity lattice point evaluation function. Needless to add, Steps 120 and 130 may be carried out before Steps 100 and 110. This is because the CMY lattice point evaluation function and the ink quantity lattice point evaluation function only have to be individually optimized.

According to the present invention, each component value of CMY lattice points is computed by multiplying an ink quantity by a matrix, as mentioned above. However, lattice point disposition is separately optimized with respect to CMY lattice points and to ink quantity lattice points, as mentioned above. Therefore, after the optimization, the relation defined by the above matrix is not maintained between CMY lattice points and ink quantity lattice points. The present invention is intended to determine optimized lattice points for correspondence definition data creation, which are used when a color correction LUT is generated, both in the virtual CMY space and in the ink quantity space.

Consequently, in the color correction LUT generator 20A, the readjusting portion 20f prevents the lattice point dispositions, separately optimized in the virtual CMY space and in the ink quantity space, from being moved as much as possible. Further, the readjusting portion 20f also readjusts the lattice point dispositions so that the correspondence defined by the above matrix will hold (Step 140). In this embodiment, the CMY lattice points in the virtual CMY space are stored at the optimized value, and the ink quantity lattice points are moved. The ink quantity space is a six-dimensional space. Therefore, minimal solutions are likely to be larger in number in the ink quantity lattice point evaluation function than in the CMY lattice point evaluation function which is an evaluation function for three-dimensional lattices. Thus, it is more difficult to discriminate a true solution.

Therefore, CMY lattice points are easier to converge in the true optimal value. In this embodiment, CMY lattice points, which are expected to have converged in the true optimal value, are fixed, and ink quantity lattice points are moved. Needless to add, it is not indispensable to fix CMY lattice points even in cases where with CMY lattice points fixed, it is impossible to determine the ink quantity space which minimizes the ink quantity lattice point evaluation function. When the print operation is performed with the printer 17b as in this embodiment, in general, the quantity of ink injectable per unit area in a printing medium is limited. Further, limitation is imposed to prevent inks of specific color components from being used for specific colors.

The color correction LUT generated in this embodiment is a look-up table with these conditions also taken into account. In this embodiment, these conditions are imposed as binding conditions in readjustment. As a result, the following ink quantity lattice points can be computed: lattice points which identify ink quantities wherein limitations are met with respect to the quantity of ink injectable per unit area in a printing medium and to the prevention of use of inks of specific color components for specific colors, and whose disposition in the ink quantity space is optimized. Limitation on the quantity of ink injectable per unit area in a printing medium and limitation to prevent inks of specific color components for specific colors are limitations imposed on ink quantity. Therefore, these conditions can be conveniently imposed by adopting such an embodiment that the ink quantity is readjusted after individual optimization, like this embodiment.

By the above-mentioned processing, specific lattice points are determined with the optimal disposition both in the virtual CMY space and in the ink quantity space and other various conditions taken into account. Consequently, a plurality of lattice points are subjected to the above-mentioned optimization so that the entire color spaces will be covered. Thus, LUT which brings CMY lattice points and ink quantity lattice points into correspondence with each other throughout the color spaces can be generated. In this embodiment, the lattice point disposition is optimized by minimization of the evaluation functions. Each lattice point is optimized by carrying out a plurality of times of correction (a plurality of times of minimization).

Accordingly, at Step 150, the portion 20g for generating LUT before color matching judges whether all the rounds of correction have been completed with respect to all the lattice points. The portion 20g repeats the processing of Step 100 and the following steps with respect to each lattice point until the completion of correction is judged. In the above description, lattice points which cover the entire color spaces are referred to. However, needless to add, these are representative points and an finite number of lattice points. With respect to the number of lattice points, tone jump only has to be prevented from occurring when a color correction LUT is generated. For example, the above processing only has to be performed with respect to 1,000 lattice points. After all the rounds of correction have been carried out with respect to all the lattice points, LUT before color matching (before color measuring to be described later) is generated.

At Step 160, the color measuring data acquiring portion 20h and the color correction LUT generating portion 20i generate a color correction LUT to be used in actual color conversion. That is, in the color correction LUT, it is required that colors specified by sRGB image data and color printed with CMYKlclm image data should be matched with each other. The colors specified by sRGB image data are univocally defined. Meanwhile, the output colors in ink quantities defined by CMYKlclm image data are dependent on equipment. Therefore, color measuring is performed to determine actual colors, and further, the color correction LUT is defined.

More specifically, a print patch wherein color components of the ink quantity lattice points are taken as the components of CMYKlclm image data is printed. Then, the color measuring data acquiring portion 20h acquires color measuring data obtained from color measuring by a color measuring instrument or the like. As a result, data wherein colors indicated by the ink quantity lattice points are rendered by non-equipment-dependent colors is obtained. With respect to sRGB image data, colors therein can be brought into correspondence with non-equipment dependent colors by publicly known formulas. Therefore, if a table which brings lattice points obtained by color measuring and sRGB values obtained from the color measuring values into correspondence with each other is generated, that table can be used as a color correction LUT. Color correction LUTs are generated by the above color correction LUT generating portion 20i.

In general, the number of representative colors defined by a color correction LUT is made larger than that of the lattice points for correspondence definition data creation. It is troublesome to subject too many patches to color measuring. Therefore, correspondence may be computed by subjecting some colors to color measuring and the other colors to interpolation determined from lattice points which has been subjected to the color measuring. For example, if with respect to 1,000 lattice points, patches are subjected to color measuring, as mentioned above, the number of lattice points may be reduced to 173 by using interpolation. Once a color correction LUT is generated, as mentioned above, the color correction LUT storing portion 20*b* stores the color correction LUT on a predetermined storage medium (Step 170).

(5) Optimization by CMY Lattice Point Evaluation Function:

Next, cost computation and optimization carried out when the CMY lattice point evaluation function is optimized will be described in detail. In this specification, description will be given below with lattice points in each color space taken as vectors from the origin point to lattice points in the color space. That is, each lattice point will be taken as a column vector whose element is the color component value of that lattice point. In the first stage of optimization, ink quantity vector Ipn is determined as the initial value of ink quantity lattice point.

Since the disposition of ink quantity lattice points is optimized, there is no special limitation on methods for selecting the initial value of ink quantity lattice point. For example, lattice points generated by uniformly varying the color components of ink quantity lattice points maybe adopted. Here, p is the number for a lattice point, and the following description will be given on the assumption that the number of all the lattice points is P, that is, $1 \leq p \leq P$. n represents the number of times of correction, and, letting the total number of times of correction be N, $0 \leq n \leq N$. (n=0 represents the initial state before correction.) Therefore, in a series of optimization, N times of correction are attempted with respect to all the P lattice points ($1 \leq p \leq P$) to optimize the positions of the lattice points.

Figure 6:
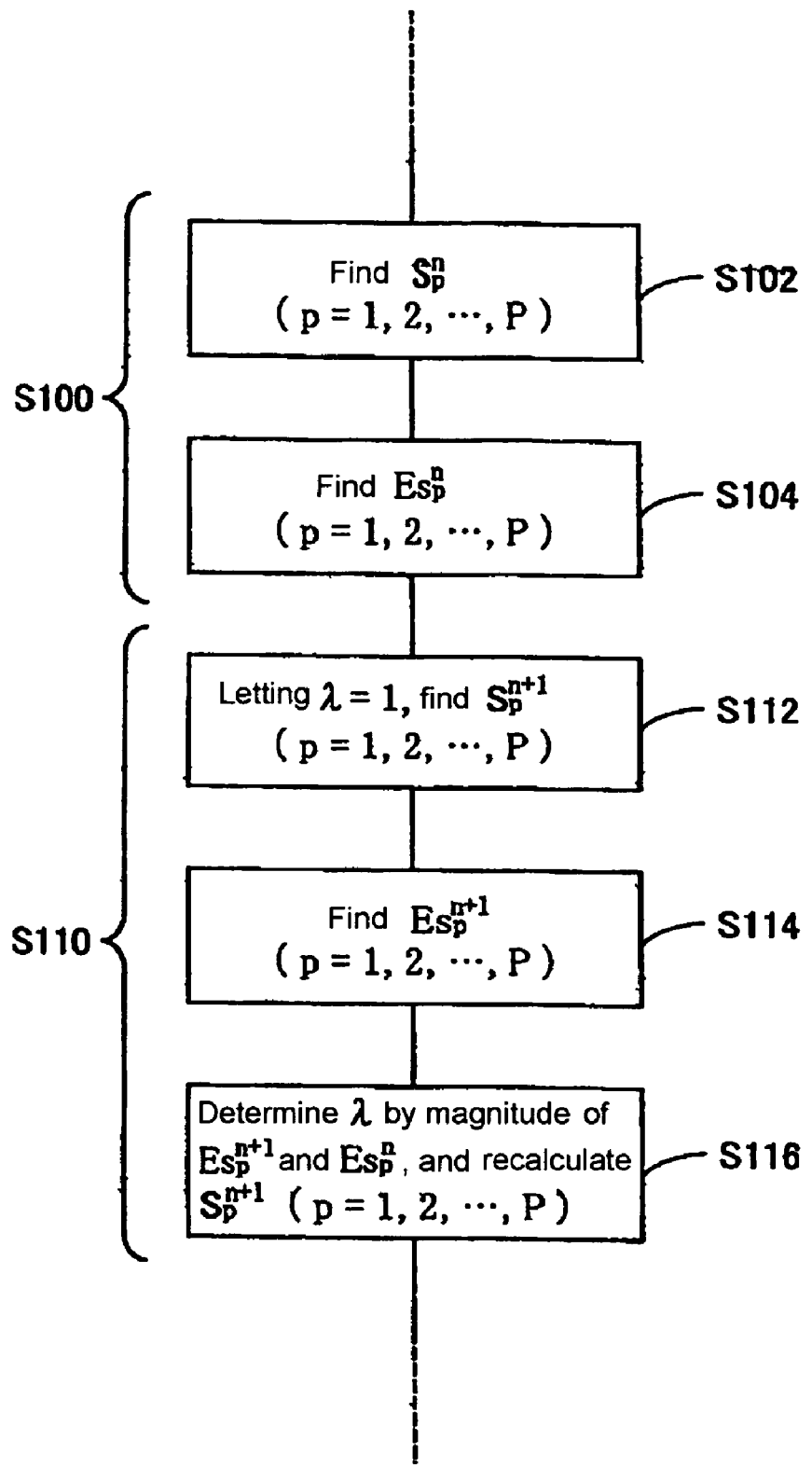
FIG. 6 is a flowchart illustrating the processing to compute CMY lattice points.

FIG. 6 is a flowchart which illustrates in detail the processing preformed at Steps 100 and 110 in FIG. 5, and this processing is performed after the ink quantity vector Ipn is determined. At Step 102, CMY vector Spn is computed. The CMY vector is a vector which specifies lattice points in the virtual CMY space.

As mentioned above, the component values of CMY lattice points can be calculated by multiplying a column vector whose elements are the six components of ink quantity by a predetermined matrix K with 3 rows and 6 columns. At Step 102, Spn is computed by Formula (1) below.

[Expression 1]

$$S_p^n = K \cdot I_p^n \quad (1)$$

In the formula, the vector quantity and the matrix are indicated in bold type. (This is the same with the following description.)

Next, at Step 104, CMY lattice point evaluation function E spn is computed. CMY lattice point evaluation function Espn is given by Formula (2) below.

$$Espn = Estpn + Esopn + Esapn \quad (2)$$

In this embodiment, the CMY lattice point evaluation function is expressed as the sum of cost terms whose value is reduced as the disposition of lattice points is smoothed.

Estpn is a cost for evaluating the smoothness of the disposition of CMY lattice points, and is a function whose value is increased as the smoothness is degraded.

Esopn is a cost for evaluating whether a CMY lattice point is close to a specific position, and is a function whose value is increased as the CMY lattice point gets away from a specific position.

Esapn is a cost for evaluating whether the color indicated by a CMY lattice point is close to a specific color, and is a function whose value is increased as the color indicated by the CMY lattice point departs from a specific color. These costs are all scalar quantities, as described later.

Each term will be described in detail below. However, it is not always required to use all the terms, but terms to be used may be selected as required. That is, according to the present invention, the terms in the CMY lattice point evaluation function and the ink quantity lattice point evaluation function to be described later, which terms are cost term Ec with respect to some vector X can be written as General Formula (3). Every condition that corresponds to this General Formula (3) can be sorted out and incorporated as a cost term.

[Expression 2] (3)

$$Ec = \begin{cases} W_1^t \cdot (M \cdot X - Y_T) \\ |W_2 \cdot (M \cdot X - Y_T)|^2 \end{cases}$$

where,

Ec is a cost (scalar value);

X is a column vector whose number of elements is X;

M is a Y×X matrix, which is a transformation matrix for transforming vector X into vector Y=MX whose number of elements is Y and which is handled in a cost;

YT is a column vector whose number of elements is Y;

W1 is a column vector whose number of elements is Y and is a vector which represents weight for each element of vector Y−Y T with respect to a cost;

W2 is a diagonal matrix of Y×Y and is a matrix which represents weight for each element of vector Y−YT with respect to a cost; and t indicates transposition.

In the following description, the first equation in Formula (3) will be referred to as "primary expression form," and the second equation will be referred to "quadratic expression form."

(5-1) Cost Estpn:

Attention will be focused on a CMY lattice point of number p, and a lattice point adjacent to the lattice point p will be let to be pj (hereafter, referred to as "reference lattice point"). A lattice point which adjoins to the lattice point p and is not the lattice point pj will be let to be pv (hereafter, referred to as "transition lattice point"). A lattice point which is a lattice point pvj adjacent to the transition lattice point pv and whose relative positional relation with the transition lattice point pv is similar to the relative positional relation between the lattice point p and the reference lattice point p j will be referred to as "transition reference lattice point pvj." That is, the direction in which the reference lattice point pj is viewed from the lattice point p is similar to the direction in which the transition reference lattice point pvj is viewed from the transition lattice point pv. The reference lattice point pj and the transition lattice point pv may be identical with each other.

Figure 7:
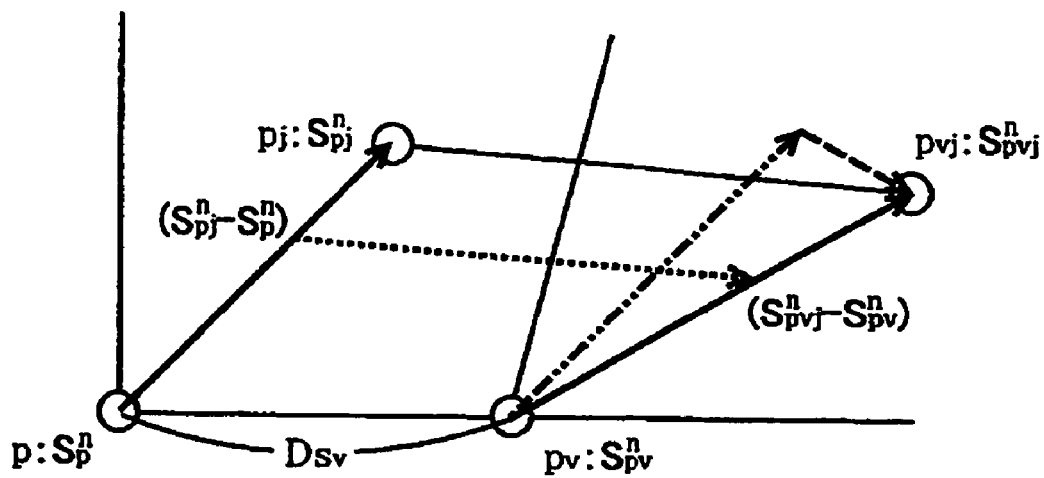
FIG. 7 is a drawing illustrating the positional relation between CMY lattice points.

As mentioned above, the vector which represents the lattice point p is Spn. In correspondence with this, column vectors whose elements are the color component values of the lattice points pj, pv, and pvj will be let to be vectors Spjn, Spvn, and Spvjn, respectively. FIG. 7 illustrates the positional relation between these lattice points. In this embodiment, the relative positional relation between the lattice point p of interest and the reference lattice point pj is compared with the relative positional relation between the transition lattice point pv and the transition reference lattice point pvj, and thereby the smoothness of the disposition of lattice points is evaluated.

Consequently, it is assumed that the relative positional relation between the lattice point p of interest and the reference lattice point pj is maintained and further the lattice point p of interest is caused to transition to the transition lattice point pv. The smoothness of the disposition of lattice points is evaluated by computation utilizing differential vectors. First, the differential vector (Spjn–Spn) between vector Spjn and vector Spn and the differential vector (Spvjn–S pvn) between vector Spvjn and vector Spvn are considered. Then, the value obtained by dividing the variation between differential vector (Spjn–Spn) and differential vector (Spvjn–Spvn) by a transition distance Dsv is defined as torsion quantity vector. That is, the variation of differential vectors per unit transition distance is defined as torsion quantity vector.

This torsion quantity vector gets smaller as the relative positional relation between the transition lattice point pv and the transition reference lattice point pvj resembles the relative positional relation between the lattice point p of interest and the reference lattice point pj. For example, in a three-dimensionally orthogonal cubic lattice, the torsion quantity is "0." In this embodiment, lattice point pj and lattice point pv are considered with respect to a lattice point p and all the lattice points adjacent thereto. Then, in every combination of them, the value obtained by adding the square of the magnitude of the torsion quantity vector is defined as a cost for evaluating the smoothness of the disposition of individual lattice points.

That is, it is defined by Formula (4) below.

[Expression 3]

$$Est_p^n = \sum_{v=1}^{V} \sum_{j=1}^{J} \left| \frac{S_p^n + S_{pvj}^n - S_{pv}^n + S_{p,j}^n}{Ds_v} \right|^2 \qquad (4)$$

where, j and v are the lattice point number for the reference lattice point and the transition lattice point, respectively; and J and V represent the number of reference lattice points and the number of transition lattice points, respectively. Various lattice points may be selected as reference lattice point or transition lattice point. Lattice points including a lattice point most adjacent to the lattice point p or including the most adjacent lattice point and the second-adjacent lattice point may be selected. As an example, a case where correction is carried out with a three-dimensional cubic lattice taken as the initial lattice point positions will be considered. In this case, six adjacent lattice points, positioned above, under, on the left and right of, in front of, and behind the lattice point p, may be selected. Or, 26 lattice points including those positioned in the diagonal directions may be selected.

Here, Formula (4) will be compared with the second equation of Formula (3). It is unnecessary to transform the CMY vector S into a vector in another space. Therefore, M turns out to be a unit matrix and may be omitted. Further, any element is not weighted. Therefore, vector W 2 similarly turns out to be a unit vector and may be omitted. (1/Dsv)2 is a constant with respect to some transition lattice point pv. Therefore, the second equation of Formula (3) and Formula (4) are in the same form.

(5-2) Cost Esopn:

Esopn is a cost for evaluating whether a CMY lattice point is close to a specific position. In this embodiment, a CMY vector before correction is adopted as the specific position. That is, when the CMY vector Spn+1 is calculated in the (n+1) th round of correction, the CMY vector Spn calculated in the nth round of correction is utilized as the specific position. Cost Esopn is defined by Formula (5).

[Expression 4]

$$Eso_p^n = |Wso \cdot (S_p^n - S_p^n)|^2 \qquad (5)$$

where, Wso is a diagonal matrix wherein the weight for each element of the CMY vector S is defined. When correction is carried out, in the CMY vector Spn of the second term in the parentheses, the component value of the lattice point p obtained from the nth round of correction is substituted to obtain a constant value. Then, the CMY vector Spn of the first term in the parentheses is considered as an independent variable.

In such an optimal value search problem that correction is repeated more than once to gradually reduce a cost, the CMY vector Spn is expected to approach an ideal value with increase in the number of times of correction. In reality, however, it dose not always approach an ideal value each time one round of correction is carried out. For example, the value of the CMY vector Spn diverges or oscillates sometimes. This divergence or oscillation frequently occurs if the CMY vector Spn is drastically moved when the (n+1)th correction is carried out subsequently to the nth correction. To cope with this, Cost Esopn is taken into account in this embodiment. Thus, the divergence and oscillation can be effectively prevented, and the CMY vector Spn can be swiftly converged.

That is, the cost shown in Formula (5) is increased as the CMY vector Spn+1 is largely varied from Spn as the result of the (n+1) th correction. Therefore, by incorporating this cost term in the CMY lattice point evaluation function, the CMY vector S is prevented from largely fluctuating by one round of correction. The influences of fluctuation in CMY vector S on costs can be adjusted by the weight of each element of the diagonal matrix Wso.

According to this cost Es opn, the divergence and oscillation can be prevented and in addition, binding conditions which reflect various intentions can be obtained. For example, such a condition as to prevent reduction in the color saturation of a color indicated by a CMY lattice point p can be imposed. To do this, a position wherein the color equivalent to the color saturation of the color indicated by the lattice point p is taken as the specific position. Thus, a binding condition which does not unnecessarily lower the color saturation can be imposed. In this case, a CMY vector Stpn having the color saturation at the same level as the color saturation of the color indicated by the CMY vector Spn may be defined, and thereby, the cost shown in Formula (6) below may be obtained.

[Expression 5]

$$Eso_p^n = |Wso \cdot (S_p^n - St_p^n)|^2 \qquad (6)$$

Needless to add, the color indicated by a CMY lattice point is not always strictly defined. This is because the color component thereof is determined by multiplication of the matrix K and the ink quantity vector Ipn. However, the color saturation is prevented from being unnecessarily lowered due to repeated correction. This is done by anticipating a color determined by at least the CMY vector S and further determining the color saturation; defining a CMY vector Stpn having the color saturation at the same level as the color saturation; and incorporating it in a cost term. It can be confirmed that Formulas (5) and (6) above are also in the same form as the second equation of Formula (3) above.

As mentioned above, in addition to a condition for preventing reduction in color saturation, a condition for maintaining appropriate memorized colors can be imposed. With respect to colors, such as gray, flesh color, green, and blue, which are different from corresponding colors memorized by humans, color correction LUTs are sometimes adjusted so that a color close to a corresponding color memorized by humans will be outputted. With respect to such colors, lattice point disposition wherein the memorized color is easy to maintain can be selected, and a CMY vector Stpn which indicates the lattice point disposition can be defined.

(5-3) Cost Esapn:

Esapn is a cost for evaluating whether a color indicated by a CMY lattice point is close to a specific color. In this embodiment, a color wherein any one of the components of CMY vector S is "0" or a color whose components are equivalent, that is, an achromatic color is adopted as the specific color. Hereafter, colors wherein any two components of CMY vector S are "0" will be referred to as "primary colors" and those wherein any one component is "0" will be referred to as "secondary colors." Achromatic colors include a case where all the components are "0."

In this embodiment, a function whose value is increased when a color indicated by a CMY lattice point deviates from a primary color, a secondary color, or an achromatic color is used as Cost Esapn. The cost is defined by Formula (7) below.

[Expression 6]

$$Esa_p^n = |Wsa_p \cdot H \cdot S_p^n|^2 \tag{7}$$

where, H is a matrix with 6 rows and 3 columns, defined by Formula (8) below; and Wsap is a diagonal matrix which is a weighting matrix indicating the weight for each element transformed by H·Spn, defined by Formula (9) below.

[Expression 7]

$$H = \begin{pmatrix} 1 & 0 & 0 \\ 0 & 1 & 0 \\ 0 & 0 & 1 \\ 1 & -1 & 0 \\ 0 & 1 & -1 \\ -1 & 0 & 1 \end{pmatrix} \tag{8}$$

[Expression 8]

$$Wsa_p = \begin{pmatrix} wsa_{pc} & 0 & 0 & 0 & 0 & 0 \\ 0 & wsa_{pm} & 0 & 0 & 0 & 0 \\ 0 & 0 & wsa_{py} & 0 & 0 & 0 \\ 0 & 0 & 0 & wsa_{pcm} & 0 & 0 \\ 0 & 0 & 0 & 0 & wsa_{pmy} & 0 \\ 0 & 0 & 0 & 0 & 0 & wsa_{pyc} \end{pmatrix} \tag{9}$$

More specific description will be given. The color components of CMY vector S will be let to be (scpn, smpn, sypn). Thus, the result of transformation by the H·Spn is vector (scpn, smpn, sypn, scpn−smpn, smpn−sypn, −scpn+sypn).

The components of matrix Wsap are defined so that finite values will be given to those on which a binding condition is imposed, of the components of this vector.

For example, in case of the primary color of cyan, the magenta component and the yellow component must be "0." That is, a cost is defined so that the value thereof will be increased by the magenta component and yellow component having finite values. In this case, the elements, other than the elements wsapm and wsapy, of the weighting matrix Wsap are set to "0," and finite values are given to wsapm and wsapy. When Formula (7) above is expanded in this situation, Formula (10) below is obtained.

[Expression 9]

$$Esa_p^n = (wsa_{pm} \cdot S_{mp}^n)^2 + (wsa_{py} \cdot S_{yp}^n)^2 \tag{10}$$

As is evident from Formula (10), when the magenta component smpn and the yellow component sypn of CMY vector Spn have a value other than "0," Cost Esapn has a finite value. Therefore, the primary color of cyan can be prevented from deviating from the primary color, by reducing Cost Esapn as much as possible. In cases where a color deviates from another primary color or secondary color, a cost can be similarly considered.

Next, a case where, for example, blue is rendered by making equivalent the cyan component and the magenta component of CMY vector Spn will be considered. At this time, the elements other than wsapcm of weighting matrix Wsap are set to "0," and a finite value is given to wsapcm. When Formula (7) above is expanded in this situation, Formula (11) below is obtained.

[Expression 10]

$$Esa_p^n = \{wsa_{pcm}(S_{cp}^n - S_{mp}^n)\}^2 \tag{11}$$

As is evident from Formula (11), if the cyan component scpn and the magenta component smpn of CMY vector Spn are not equivalent, Cost Esapn has a finite value. Therefore, a situation wherein the cyan component and the magenta component are equivalent is prevented from being deviated from, by reducing Cost Esapn as much as possible. In cases where the cyan component and the yellow component are made equivalent or the yellow component and the magenta component are made equivalent, a cost can be similarly considered. As in these examples, the weighting elements of Wsap can take various values depending on the conditions of the lattice point p.

Needless to add, in this embodiment, Cost Esapn is not a condition imposed on the lattice point of every number p. But it is a condition imposed on a lattice point of a specific lattice point number. When an image is handled with a computer, the gradation value thereof is often limited to a positive value. According to this embodiment, with respect to a color any color component of which is "0," Cost Esapn is a function whose value is increased as that component deviates from "0." This can be considered as imposing a condition for preventing any color component from becoming negative. Formula (7) above corresponds to the second equation of Formula (3) above with YT set to "0." Needless to add, if a maximum value is defined for the gradation value of each color component, a function whose cost is increased when the coordinate value is greater than the maximum value may be adopted.

(5-4) Computation of Vector Which Gives Minimal Value:

Once the individual cost terms are computed, as mentioned above, CMY lattice point evaluation function Espn can be obtained by Formula (2) above. Then, the processing of steps up to Step 104 in FIG. 6 is carried out. Thereafter, at Step 112 to Step 116, the minimal value of CMY lattice point evaluation function Espn is computed, and optimization is thereby carried out. There are various techniques for computing the minimal value of CMY lattice point evaluation function Espn. In this embodiment, the following technique is adopted which makes it possible to effectively prevent the components of CMY lattice points from oscillating or diverging.

The CMY lattice point evaluation function Espn is the sum of Formulas (4), (5), and (7), and the CMY vector Spn is contained in all of these terms. Therefore, the CMY lattice point evaluation function Espn is a function of CMY vector Spn. That is, it can be expressed by a function fs, as in Formula (12) below.

[Expression 11]

$$Es_p{}^n = fs(S_p{}^n) \qquad (12)$$

Here, it is assumed that the CMY lattice point evaluation function Espn can take the minimum value if correction quantity vector ep is added to the CMY vector Spn. Thus, the vector obtained by partially differentiating Formula (13) below with the elements of CMY vector Spn becomes a zero vector. This is expressed by Formula (14).

[Expression 12]

$$Es_p{}^n = fs(S_p{}^n + e_p) \qquad (13)$$

[Expression 13] (14)

$$As_p^n = \frac{\partial}{\partial s_{qp}^n} fs(S_p^n + e_p) = 0_3$$

$$(q = c, m, y)$$

where, sqpn represents the component of CMY vector Spn; and q represents the identification of the component. The components of vector Aspn are obtained by partially differentiating Formula (13) with scpn, smpn, and sypn, respectively.

In this embodiment, Formula (14) above is solved with respect to the correction quantity vector ep, and the CMY vector from the (n+1)th correction is obtained from the CMY vector from the nth correction by Formula (15) below.

[Expression 14]

$$S_p{}^{n+1} = S_p{}^n + \lambda e_p \qquad (15)$$

where, λ is an arbitrary scalar value and a coefficient related to the correction quantity vector ep, in general, 0≦λ≦1. If λ=1, it turns out that Formula (14) above is directly solved.

In this embodiment, by making adjustment within a range of 0≦λ≦1, the CMY vector is caused to efficiently converge, and further, the components of CMY lattice points are prevented from oscillating or diverging.

More specifically, the first equation of Formula (14) is expressed as in Formulas (16) to (19) below.

[Expression 15] (16)

$$As_p^n = Ast_p^n + Aso_p^n + Asa_p^n$$

-continued $$Ast_p^n = \frac{\partial}{\partial s_{qp}^n}\left\{\sum_{v=1}^{V}\sum_{j=1}^{J}\left|\frac{(S_p^n + e_p) + S_{pvj}^n - S_{pv}^n - S_{pj}^n}{Ds_v}\right|^2\right\} \qquad (17)$$

$$= 2J\left(\sum_{v=1}^{V}\frac{1}{Ds_v^2}\right)(S_p^n + e_p) - 2J\sum_{v=1}^{V}\frac{S_{pv}^n}{Ds_v^2} +$$

$$2\sum_{v=1}^{V}\left\{\frac{1}{Ds_v^2}\sum_{j=1}^{J}(S_{pvj}^n - S_{pj}^n)\right\}$$

$$Aso_p^n = \frac{\partial}{\partial s_{qp}^n}[|Wso \cdot \{(S_p^n + e_p) - St_p^n\}|^2] \qquad (18)$$

$$= 2Wso^t \cdot Wso \cdot (S_p^n + e_p) - 2Wso^t \cdot Wso \cdot St_p^n$$

$$Asa_p^n = \frac{\partial}{\partial s_{qp}^n}\{|Wsa_p \cdot H \cdot (S_p^n + e_p)|^2\} \qquad (19)$$

$$= 2(Wsa_p \cdot H)^t \cdot Wsa_p \cdot H \cdot (S_p^n + e_p)$$

where, Astpn, Asopn, and Asapn, respectively, represent vectors obtained by partially differentiating Estpn, Esopn, and Esapn with the components of CMY vector Spn; and t represents the transposition of a matrix q in Formulas (17) to (19) is the same as the above-mentioned q, which is a sign for identifying the components of vectors. In Formula (17), Dsv is calculated using the components of CMY vector Spn. However, in this embodiment, it is handled as a constant for the simplification of processing.

If Formula (14) is solved utilizing Formulas (16) to (19) with respect to the correction quantity vector ep, the result is expressed as Formula (20). In Formula (20), Qs is expressed by Formula (21), and Bs is expressed by Formula (22). "−1" in Formula (20) indicates inverse matrix, and U in Formula (21) indicates unit matrix.

[Expression 16] (20)

$$e_p = Qs^{-1} \cdot Bs$$

$$Q_s = J\left(\sum_{v=1}^{V}\frac{1}{Ds_v^2}\right)U_3 + Wso^t \cdot Wso + (Wsa_p \cdot H)^t \cdot Wsa_p \cdot H \qquad (21)$$

$$Bs = J\sum_{v=1}^{V}\frac{S_{pv}^n}{Ds_v^2} - \sum_{v=1}^{V}\left\{\frac{1}{Ds_v^2}\sum_{j=1}^{J}(S_{pvj}^n - S_{pj}^n)\right\} + \qquad (22)$$

$$Wso^t \cdot Wso \cdot St_p^n - Qs \cdot S_p^n$$

According to Formula (20), the correction quantity vector e p in Formula (15) above can be calculated. Therefore, if λ is determined, CMY vector Spn+1 from the (n+1)th correction can be calculated. In this embodiment, at Step 112 in FIG. 6, the correction quantity vector ep is calculated by Formula (20), and, letting λ=1, the CMY vector Spn+1 is calculated by Formula (15) with respect to 1≦p≦P. At Step 114, the CMY vector Spn+1 is substituted for the CMY vector Spn in Formulas (4), (5), and (7) to calculate the (n+1)th value of CMY lattice point evaluation function Espn+1 (1≦p≦P).

Here, if Espn+1>Espn, λ is reduced, and the CMY vector Spn+1 is calculated again (Step 116). More specific description will be given. If Espn+1>Espn, it cannot be said that the disposition of CMY lattice points has been smoothed by the (n+1)th correction. Therefore, λ is reduced, and thereby, the quantity of the (n+1)th correction is reduced. Various techniques are available for calculating λ. In this embodiment, Formula (23) below is adopted.

[Expression 17] (23)

$$\lambda = \begin{cases} \left(\dfrac{Es_p^n}{Es_p^{n+1}}\right)^2 & (Es_p^{n+1} > Es_p^n) \\ 1 & (Es_p^{n+1} \leq Es_p^n) \end{cases}$$

λ is determined by Formula (23) above, and the CMY vector Spn+1 is eventually determined by Formula (15) above with respect to all the lattice point numbers p ($1 \leq p \leq P$). Various techniques can be adopted as the technique for calculating λ, as mentioned above. The comparison of Costs Estpn and Estpn+1 is also acceptable.

(6) Optimization by Ink Quantity Lattice Point Evaluation Function:

Next, cost computation and optimization carried out when the ink quantity lattice point evaluation function is optimized will be described in detail. In the first stage of optimization, ink quantity vector Ipn has been determined as the initial value of ink quantity lattice point, as mentioned above. Cost computation and the optimization of the evaluation function are carried out utilizing this value. Here again, p is the number for a lattice point, and the following description will be given on the assumption that the number of all the lattice points is P, that is, $1 \leq p \leq P$. n represents the number of times of correction, and, letting the total number of times of correction be N, $0 \leq n \leq N$. (n=0 represents the initial state before correction.) Therefore, in a series of optimization, N times of correction are attempted with respect to all the P lattice points ($1 \leq p \leq P$) to optimize the positions of lattice points.

The optimization by the ink quantity lattice point evaluation function has been carried out at Step 120 and Step 130 in FIG. 5, as mentioned above. At Step 120, the ink quantity lattice point evaluation function Eipn is computed first. The ink quantity lattice point evaluation function Eipn is given by Formula (24) below.

$$Eipn = Eitpn + Eiopn \quad (24)$$

In this embodiment, the ink quantity lattice point evaluation function is expressed by the sum of cost terms whose value is reduced as the disposition of lattice points is smoothed. Eitpn is a cost for evaluating the smoothness of the disposition of ink quantity lattice points, and is a function whose value is increased as the smoothness is degraded.

Eiopn is a cost for evaluating whether an ink quantity lattice point is close to a specific position, and is a function whose value is increased as the ink quantity lattice point gets away from a specific position. Each term will be described in detail below. However, it is not always required to use all the terms, but terms to be used may be selected as required. With respect to the ink quantity lattice point evaluation function as well, a cost for evaluating whether a color indicated by an ink quantity lattice point is close to a specific color may be considered as with the above-mentioned CMY lattice points.

(6-1) Cost Eitpn:

Cost Eitpn in the ink quantity lattice point evaluation function can be considered similarly with Cost Estpn in the CMY lattice point evaluation function. Then, the smoothness of the disposition of lattice points in the ink quantity space can be thereby evaluated. More specifically, attention will be focused on an ink quantity lattice point of number p, and a lattice point adjacent to the lattice point p will be let to be reference lattice point pj. Further, a lattice point which adjoins to the lattice point p and is not the lattice point pj will be let to be transition lattice point pv. A lattice point which is a lattice point pvj adjacent to the transition lattice point pv and whose relative positional relation with the transition lattice point pv is similar to the relative positional relation between the lattice point p and the reference lattice point pj will be referred to as "transition reference lattice point pvj."

Figure 8:
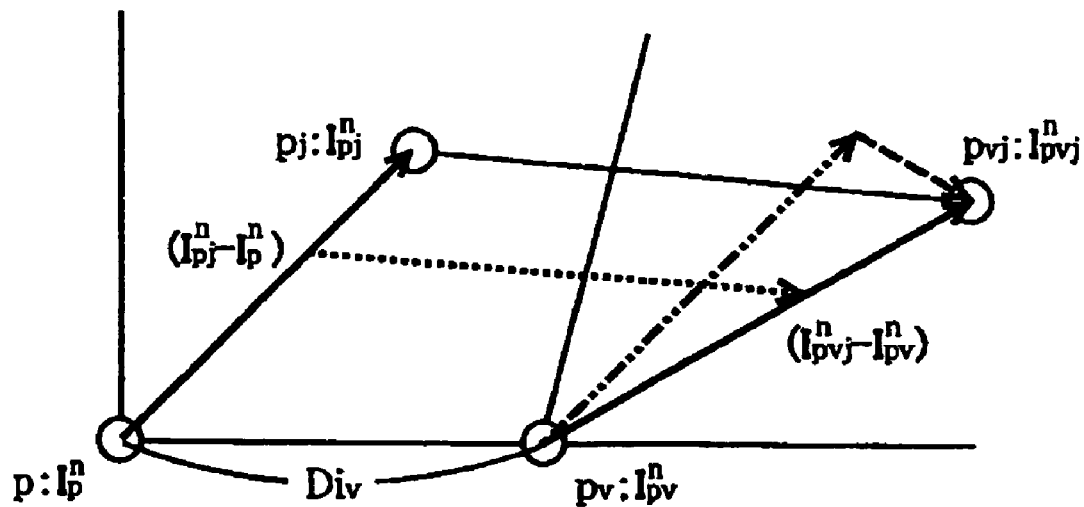
FIG. 8 is a drawing illustrating the positional relation between ink quantity lattice points.

That is, though the ink quantity space is six-dimensional, the smoothness of lattice point disposition can be evaluated by defining Cost Eitpn similarly with the above-mentioned Cost Estpn. This is done by defining a lattice point p of interest, a reference lattice point pj, a transition lattice point pv, and a transition reference lattice point pvj just like the definition with respect to the virtual CMY space. Here again, column vectors whose elements are the color component values of lattice points pj, pv, and pvj will be let to be vectors Ipjn, Ipvn, and Ipvjn, respectively. FIG. 8 schematically illustrates the positional relation between the above-mentioned lattice points.

Here again, it is assumed that the relative positional relation between the lattice point p of interest and the reference lattice point pj is maintained and further the lattice point p of interest is caused to transition to the transition lattice point pv. The smoothness of the disposition of lattice points is evaluated by computation utilizing differential vectors. Then, the value obtained by dividing the variation between differential vector (Ipjn−Ipn) and differential vector (Ipvjn−Ipvn) by a transition distance Div is defined as torsion quantity vector. In other words, the variation in differential vector per unit transition distance is defined as torsion quantity vector.

The torsion quantity vector is reduced as the relative positional relation between the transition lattice point pv and the transition reference lattice point pvj resembles the relative positional relation between the lattice point p of interest and the reference lattice point pj. In this embodiment, lattice point pj and lattice point pv are considered with respect to a lattice point p and all the lattice points adjacent thereto. Then, in every combination of them, the value obtained by adding the square of the magnitude of the torsion quantity vector is defined as a cost for evaluating the smoothness of the disposition of individual lattice points.

That is, it is defined by Formula (25) below.

[Expression 18] (25)

$$Eit_p^n = \sum_{v=1}^{V} \sum_{j=1}^{J} \left| \dfrac{I_p^n + I_{pvj}^n - I_{pv}^n - I_{pj}^n}{Di_v} \right|^2$$

where, j and v are the lattice point number for the reference lattice point and the transition lattice point, respectively; and J and V represent the number of reference lattice points and the number of transition lattice points, respectively. Various lattice points maybe selected as reference lattice point or transition lattice point. Lattice points including a lattice point most adjacent to the lattice point p or including the most adjacent lattice point and the second-adjacent lattice point may be selected.

Here, Formula (25) will be compared with the second equation of Formula (3). It is unnecessary to transform the ink quantity vector I into a vector in another space. Therefore, M turns out to be a unit matrix and may be omitted. Further, any element is not weighted. Therefore, vector W 2 similarly turns out to be a unit vector and may be omitted. (1/Div)2 is a constant with respect to some transition lattice point pv. Therefore, the second equation of Formula (3) and Formula (25) are in the same form.

(6-2) Cost Eiopn:

Eiopn is a cost for evaluating whether an ink quantity lattice point is close to a specific position. In this embodiment, an ink quantity vector before correction is adopted as the specific position. That is, when the ink quantity vector Ipn+1 is calculated in the (n+1) th round of correction, the ink quantity vector Ipn calculated in the nth round of correction is utilized as the specific position. Cost Eiopn is defined by Formula (26).

[Expression 19]

$$Eio_p^n = |Wio \cdot (I_p^n - I_p^n)|^2 \qquad (26)$$

where, Wio is a diagonal matrix wherein the weight for each element of the ink quantity vector I is defined. When correction is carried out, in the ink quantity vector Ipn of the second term in the parentheses, the component value of the lattice point p obtained from the nth round of correction is substituted to obtain a constant value. Then, the ink quantity vector Ipn of the first term in the parentheses is considered as an independent variable.

Here again, Cost Eiopn is taken into account. Thus, the divergence and oscillation can be effectively prevented, and the ink quantity vector Ipn can be swiftly converged. The influences of fluctuation in ink quantity vector I on costs can be adjusted by the weight of each element of the diagonal matrix Wio. According to this cost Eiopn as well, the divergence and oscillation can be prevented and in addition, binding conditions which reflect various intensions can be obtained. For example, such a condition as to prevent reduction in the color saturation of a color indicated by an ink quantity lattice point p can be imposed. In this case, an ink quantity vector Itpn having the color saturation at the same level as the color saturation of the color indicted by the ink quantity vector Ipn may defined, and thereby, the cost shown in Formula (27) below may be obtained.

[Expression 20]

$$Eio_p^n = |Wio \cdot (I_p^n - It_p^n)|^2 \qquad (27)$$

It can be confirmed that Formulas (26) and (27) above are also in the same form as the second equation of Formula (3) above.

In addition to a condition for preventing reduction in color saturation, a condition for maintaining appropriate memorized colors can be imposed. Lattice point disposition wherein the memorized color is easy to maintain can be selected, and an ink quantity vector Itpn which indicates the lattice point disposition can be defined. The appearance of a color can be largely changed depending on the light source. To prevent this, various measures are taken. Such measures include using inks which have special spectral characteristics for colors which are susceptible to light sources, and reducing the quantities of specific inks consumed to a certain level or below. In this case, such an ink quantity vector Itpn as to meet these conditions may be defined.

(6-3) Computation of Vector Which Gives Minimal Value:

Once the individual cost terms are computed, as mentioned above, ink quantity lattice point evaluation function Eipn can be obtained by Formula (24) above. Then, at Step 130 in FIG.

5, the minimal value of ink quantity lattice point evaluation function Eipn is computed, and optimization is thereby carried out. There are various techniques for computing the minimal value of ink quantity lattice point evaluation function Eipn. In this embodiment, a technique which is different from that for the optimization of the CMY lattice point evaluation function is adopted. More specifically, in the optimization of ink quantity lattice point evaluation function, an algorithm is used. This algorithm is inferior in the accuracy of minimal value computation to that for the optimization of the CMY lattice point evaluation function but enables high-speed processing. This is because the disposition of ink quantity lattice points is readjusted as described later. Needless to add, the same algorithm as for the optimization of the CMY lattice point evaluation function may be adopted.

The ink quantity lattice point evaluation function Eipn is the sum of Formulas (25) and (26), and the ink quantity vector Ipn is contained in all of these terms. Therefore, the ink quantity lattice point evaluation function Eipn is a function of ink quantity vector Ipn. That is, it can be expressed by a function fi, as in Formula (28) below.

[Expression 21]

$$Ei_p^n = fi(I_p^n) \qquad (28)$$

Here, when the vector (Formula (29)) obtained by partially differentiating Formula (28) with the components of ink quantity vector Ipn becomes a "0" vector, Eipn is minimized.

[Expression 22]

$$AI_p^n = \frac{\partial}{\partial i_{mp}^n} fi(I_p^n) = 0_M \qquad (29)$$

where, impn represents the component of ink quantity vector Ipn; and m represents the identification of the component. That is, in this embodiment, m=1, 2, . . . 6.

In this embodiment, Formula (29) above is solved, and the ink quantity vector Ipn is thereby calculated. More specifically, the first equation of Formula (29) is expressed as in Formulas (30) to (32) below.

[Expression 23]

$$AI_p^n = Ait_p^n + Aio_p^n \qquad (30)$$

$$Ait_p^n = \frac{\partial}{\partial i_{mp}^n} \left\{ \sum_{v=1}^{V} \sum_{j=1}^{J} \left| \frac{I_p^n + I_{pvj}^n - I_{pv}^n - I_{pj}^n}{Di_v} \right|^2 \right\} \qquad (31)$$

$$= 2J \left( \sum_{v=1}^{V} \frac{1}{Di_v^2} \right) I_p^n - 2J \sum_{v=1}^{V} \frac{I_{pv}^n}{Di_v^2} +$$

$$2 \sum_{v=1}^{V} \left\{ \frac{1}{Di_v^2} \sum_{j=1}^{J} (I_{pvj}^n - I_{pj}^n) \right\}$$

$$Aio_p^n = \frac{\partial}{\partial i_{mp}^n} [|Wio \cdot (I_p^n - It_p^n)|^2] \qquad (32)$$

$$= 2Wio^t \cdot Wio \cdot I_p^n - 2Wio^t \cdot Wio \cdot It_p^n$$

where, Aitpn and Aiopn, respectively, represent vectors obtained by partially differentiating Eitpn and Eiopn with the components of ink quantity vector Ipn. m in Formulas (30) to (32) is the same as the above-mentioned m, which is a sign for identifying the components of vectors. In Formula (31), Div is calculated using the components of ink quantity vector Ipn. However, in this embodiment, it is handled as a constant for the simplification of processing.

If Formula (29) is solved by Formulas (30) to (32) with respect to the ink quantity vector Ipn and the solution is ink quantity vector Ipn+1 obtained by updating the ink quantity vector Ipn, that is expressed as Formula (33) below. In Formula (33), Qi is expressed by Formula (34), and Bi is expressed by Formula (35). "−1" in Formula (33) indicates inverse matrix, and U in Formula (34) indicates unit matrix.

[Expression 24]

$$I_p^{n+1} = Qi^{-1} \cdot Bi \quad (33)$$

$$Qi = J\left(\sum_{v=1}^{V} \frac{1}{Di_v^2}\right) U_M + Wio^t \cdot Wio \quad (34)$$

$$Bi = J \sum_{v=1}^{V} \frac{I_{pv}^n}{Di_v^2} - \sum_{v=1}^{V} \left\{ \frac{1}{Di_v^2} \sum_{j=1}^{J} (I_{pvj}^n - I_{pj}^n) \right\} + Wio^t \cdot Wio \cdot I_p^n \quad (35)$$

The ink quantity vector Ipn+1 can be calculated as mentioned above. Therefore, when the ink quantity vector Ipn+1 is eventually determined by Formula (33) above with respect to all the lattice point numbers p (1≦p≦P), one round of correction is completed.

(7) Readjustment Processing:

At Steps 100 to 130, when the CMY vector Spn+1 and the ink quantity vector Ipn+1 are calculated, the CMY lattice point evaluation function Espn and the ink quantity lattice point evaluation function Eipn are separately minimized. Therefore, there is no correlation between both the vectors. If the vectors are directly brought into correspondence with each other, LUT before color matching is not obtained. Consequently, in this embodiment, the readjustment processing shown in the box of Step 140 is carried out to bring them into correspondence with each other.

Each component of the CMY vector Spn+1 can be calculated by multiplying each component of the ink quantity vector Ipn+1 by the above-mentioned matrix K. Therefore, if Formula (1) above is taken as a binding condition and further the ink quantity vector Ipn+1 is moved, predetermined correlation is obtained between both the vectors. Since with respect to the ink quantity vector Ipn+1, lattice point positions have been optimized by the above-mentioned minimization, the shorter the moving distance is the better. Consequently, here again, such an evaluation function as mentioned above is considered. That is, an evaluation function for first readjustment whose costs are increased with increase in the movement of the ink quantity vector Ipn+1 is considered. Then, an ink quantity vector obtained by minimizing the evaluation function for first readjustment is taken as a vector after readjustment.

However, a solution which minimizes the evaluation function for first readjustment cannot always be found. To cope with this, in this embodiment, the CMY vector Spn+1 is moved if no solution is found. Since the CMY lattice points have been optimized, here again, it is avoided as much as possible to move CMY lattice points. Therefore, an evaluation function for second readjustment whose costs are increased with increase in the movement of both the CMY vector Spn+1 and the ink quantity vector Ipn+1 is considered.

Figure 9:
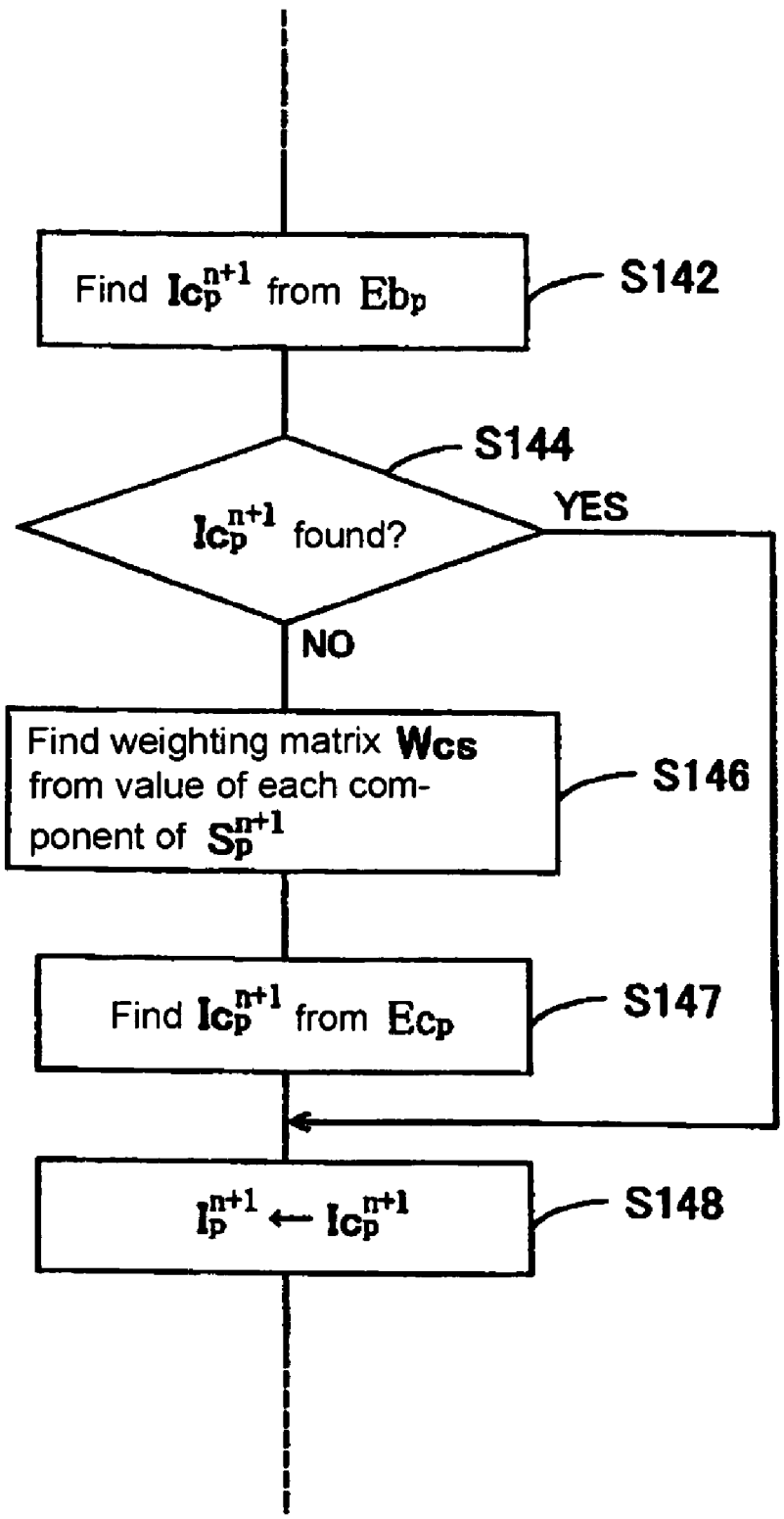
FIG. 9 is a flowchart illustrating readjustment processing.

More specifically, the processing is carried out in accordance with the flowchart in FIG. 9. FIG. 9 is a flowchart illustrating in detail the processing carried out at Step 140 in FIG. 5. In this embodiment, the evaluation function for first readjustment is given as Formula (36) below.

[Expression 25]

$$Eb_p = |Ic_p^{n+1} - I_p^{n+1}|^2 \quad (36)$$

where, the ink quantity vector Icpn+1 is a vector after readjustment; and the ink quantity vector Ipn+1 is a vector before readjustment, that is, the ink quantity vector calculated at Step 130.

When print operation is performed with a printer 17b, in general, there is limitation on the quantity of ink injectable per unit area in a printing medium. Further, limitation is imposed to prevent the use of inks of specific color components for specific colors. Consequently, in the minimization, binding conditions wherein these limitations are formulated can be imposed. Thereby, an ink quantity vector wherein the limitation on ink quantity is met and further the above lattice point positions are optimized can be determined.

In this embodiment, these limitations on ink quantity and a binding condition by the above-mentioned matrix K are imposed. These conditions are expressed by Formulas (37) to (39) below.

[Expression 26]

$$K \cdot Ic_p^{n+1} = S_p^{n+1} \quad (37)$$

$$\sum_{m=1}^{M} wd_{lm} \cdot ic_{mp}^{n+1} \le d_l \quad (38)$$

$$wo_m \cdot ic_{mp}^{n=1} = 0 \quad (39)$$

where, icmpn+1 is each component of the ink quantity vector Icpn+1; and wdlm is a coefficient for calculating the total value of ink quantities with respect to an arbitrary combination of the ink quantity components, which can take 1 or 0.

dl represents the ink quantity limitation value, which is the maximum value of the total value of combined ink quantity components. L is the number of conditions of ink quantity limitation values, and l is the condition number therefor. That is, Formula (38) is a formulated ink quantity limitation. Formula (39) is a formulated limitation for preventing use of inks of specific color components for specific colors. wom is a coefficient which can take 1 if a specific ink quantity component is not used at some lattice point and 0 in any other case. That is, this formula indicates conditions for cases where the existence of a specific ink is not permitted at a lattice point indicated by a combination of ink quantity components i cmpn+1 (cases where the specific ink quantity component must not have any value other than 0). m is the component number of ink quantity vector, and in this embodiment, m=1, 2, . . . 6.

At Step 142, Formula (36) above is minimized with Formulas (37) to (39) above taken as binding conditions. In this embodiment, a technique designated as quadratic programming is adopted. At this time, to incorporate the inequality indicated as Formula (38) in the binding conditions, a nonnegative artificial variable iul is considered, and Formula (38) is transformed into Formula (40).

[Expression 27]

$$\left(\sum_{m=1}^{M} wd_{lm} \cdot ic_{mp}^{n+1}\right) + iu_l = d_l \qquad (40)$$

Then, Formulas (37), (39), and (40) representing the binding conditions are expressed in one formula as Formula (41).

[Expression 28]

$$A \cdot Ix = B \qquad (41)$$

$$A = \begin{pmatrix} K & & & & 0_{3L} \\ wd_{11} & \cdots & wd_{1M} & & \\ & \vdots & & & \\ \vdots & wd_{lM} & \vdots & U_L & \\ & \vdots & & & \\ wd_{L1} & \cdots & wd_{LM} & & \\ wo_1 & \cdots & 0 & & \\ & \vdots & & & \\ \vdots & wo_m & \vdots & 0_{ML} & \\ & \vdots & & & \\ 0 & \cdots & wo_M & & \end{pmatrix}$$

$$Ix = (Ic_p^{n+1} \quad iu_1 \quad \cdots \quad iu_l \quad \cdots \quad iu_L)^t$$

$$B = (Sp_p^{n+1} \quad d_1 \quad \cdots \quad d_l \quad \cdots \quad d_L \quad 0 \quad \cdots \quad 0)^t$$

The matrix A is a matrix with (3+L+M) rows and (M+L) columns, and in this embodiment, the number of inks is 6. Therefore, the 3 rows and M columns at the upper left correspond to the above-mentioned matrix K with 3 rows and 6 columns for transforming the 6 component values of ink quantity into 3 component values of CMY lattice point, and 3 rows and L columns at the upper right are a zero matrix. The L rows and M columns at the middle left are a matrix whose components are the above mentioned coefficient wdlm. UL at the middle right are a unit matrix with L rows and L columns. The M rows and M columns at the lower left are a diagonal matrix whose diagonal components are the coefficient wom. 0 ML at the lower left is a zero matrix with M rows and L columns. The vector Ix is a vector whose components are the ink quantity vector Icpn+1 and the artificial variable iul. The vector B is a vector whose components are the CMY vector Spn+1, the ink quantity limitation value dl, and 0.

Therefore, it turns out that Formulas (37), (39), and (40) which are binding conditions in this embodiment are formulated as one formula by Formula (41) above. As mentioned above, the evaluation function for first readjustment is given by Formula (36) above. Therefore, substituting the ink quantity vector Icpn+1 and the ink quantity vector Ipn+1 in the formula with a vector with the binding conditions taken into account and minimizing the formula are considered. That is, if the ink quantity vector Icpn+1 and the ink quantity vector Ipn+1 in Formula (36) are substituted with vector Ix and vector Iy (Formula (42)), the formula can be expanded as follows:

[Expression 29]

$$Iy = (I_p^{n+1} 0 \ldots 0) \qquad (42)$$

[Expression 30]

$$\begin{aligned} Eb_p &= |Ix - Iy|^2 \qquad (43) \\ &= Ix^t \cdot Ix - 2Iy^t \cdot Ix + Iy^t \cdot Iy \\ &= d + C^t \cdot Ix + \frac{1}{2} Ix^t \cdot Q \cdot Ix \end{aligned}$$

where, $d = Iy \cdot Iy$; $C = -2\ Iy$; and $Q = 2U$ (U is a unit matrix with (M+L) rows and (M+L) columns).

That is, in quadratic programming according to this embodiment, Formula (43) only has to be capable of being minimized with Formula (41) taken as a binding condition. When a specific formula is minimized under a specific condition, Lagrange's method of undetermined multipliers can be utilized. The general-purpose function F in Lagrange's method of undetermined multipliers can be expressed by Formula (44) below.

[Expression 31]

$$\begin{aligned} F(Ix, Ra) &= Eb_p + Ra^t \cdot (A \cdot Ix - B) \qquad (44) \\ &= d + C^t \cdot Ix + \frac{1}{2} Ix^t \cdot Q \cdot Ix + Ra^t \cdot (A \cdot Ix - B) \end{aligned}$$

In Formula (44), vector Ra is a Lagrange's undetermined multiplier vector, which is a column vector with (3+L+M) columns. If a vector Ix which gives the minimal value of the general-purpose function F exists, the vector Ra is a basic variable vector.

Further, a column vector Mu with a (M+L) columns indicated in Formula (45) is brought in. Since Formula (45) is 0, Formula (45) is subtracted from Formula (44) to obtain Formula (46), and this Formula (46) is minimized.

[Expression 32]

$$MU^t \cdot Ix0 \qquad (45)$$

$$F(Ix, Ra) = d + C^t \cdot Ix + \frac{1}{2} Ix^t \cdot Q \cdot Ix + Ra^t \cdot (A \cdot Ix - B) - Mu^t \cdot Ix \qquad (46)$$

In Formula (45), vector Mu is an artificial variable vector. The components thereof are so constituted that, if either is a basic variable with respect to components to which the vector Ix corresponds, the other is a non-basic variable. Hence, Formula (45) above is zeroed.

Here, the general-purpose function F is partially differentiated with the components of the vector Ix is made a zero vector as in Formula (47) below. Then, the vector Ix at this time is determined. Thus, the vector Ix when the general-purpose function F is minimized can be obtained.

[Expression 33]

$$\begin{aligned} \frac{\partial}{\partial ix_{nt}} F(Ix, Ra) &= C + Q \cdot Ix + A^t \cdot Ra - Mu \qquad (47) \\ &= 0_{Nt} \end{aligned}$$

In Formula (47), ixnt represents a component of vector I x; nt (=1 to (M+L)) is a component number of vector Ix. 0 Nt is a zero vector with (M+L) columns. If an optimal solution which minimizes Formula (46) exists, then vector Ix which satisfies all of Formulas (41), (47), and (45) above exists. As a concrete solution for calculating the vector Ix, the simplex first-stage solution, which is widely known with respect to linear programming, or the like can be adopted. Needless to add, in addition to quadratic programming, various solutions, including pseudo-Newton method, can be adopted for minimizing Formula (36) above.

As mentioned above, at Step 142, the optimal solution is computed to calculate the ink quantity vector Icpn+1. Under some conditions, Formula (37) and Formula (38) or (39) are not compatible with each other. Consequently, at Step 144, it is judged whether the ink quantity vector Icpn+1 was calculated at Step 142. If it is judged at Step 144 that the ink quantity vector Icpn+1 was calculated, at Step 148, the ink quantity vector Icpn+1 is substituted into the ink quantity vector Ipn+1. Thus, the result is taken as an ink quantity vector value after readjustment.

If it is not judged at Step 144 that the ink quantity vector Icpn+1 was calculated, at Steps 146 and 147, the movement of CMY lattice points is permitted. Further, the ink quantity vector and the CMY vector are readjusted with the limitations on ink quantity taken into account. In this embodiment, the movement of CMY lattice points is reduced as much as possible. Therefore, Formula (48) below is adopted as the evaluation function for second readjustment.

[Expression 34]

$$Ec_p = |Wci \cdot (Ic_p^{n+1} - I_p^{n+1})|^2 + |Wcs \cdot (K \cdot Ic_p^{n+1} - S_p^{n+1})|^2 \quad (48)$$

Here, Wci is a diagonal matrix with M rows and M columns, and each component is a weighting matrix representing the weight for each ink quantity component. Wcs is a diagonal matrix with 3 rows and 3 columns, and each component is a weighting matrix representing the weight for each CMY component. By adjusting the value of each weighting matrix, the movement of CMY lattice points and ink quantity lattice points can be adjusted relative to each other. For example, it may be desired to make the movement of CMY lattice points smaller than the movement of ink quantity lattice points. In this case, a weighting factor can be determined under such a condition as Formula (49) below with respect to arbitrary m and q.

$$wcim \ll wcsq \quad (49)$$

where, wcim is a diagonal component of the matrix Wci; and wcsq is a diagonal component of the matrix Wcs.

The weighting factor wcsq is so set that the value thereof will be increased as the values of the components of the CMY vector are reduced. For example, the cyan component and the magenta component of CMY vector Spn+1 are compared with each other. If the value of the cyan component is larger than that of the magenta component, the weighting factor is determined as indicated in Formula (50) below.

$$wcsc \leq wcsm \quad (50)$$

More specific description will be given. A smaller component value of CMY vector is more largely influenced by a certain amount of variation than a larger component value is. Therefore, the magnitude of inverse number order is given to the weighting factor, and the influences are thereby lessened (averaged).

At Step 146, the weighting matrix Wcs is calculated from each component value of CMY vector Spn+1, as mentioned above. Further, the matrix Wci is computed to determine the evaluation function Ecp for second readjustment shown in Formula (48). At Step 147, the optimal solution which minimizes the evaluation function Ecp for second readjustment shown in Formula (48), and thereby the ink quantity vector Icpn+1 when Ecp is minimized is calculated. At this time, by utilizing quadratic programming, which was utilized to minimize the evaluation function for first readjustment, the optimal solution can be computed. As binding conditions, Formulas (38) and (39) are utilized. The concrete solving method is in accordance with the solving method for minimizing the evaluation function for first readjustment.

After the ink quantity vector Icpn+1 is calculated as mentioned above, the ink quantity vector Icpn+1 is substituted into the ink quantity vector Ipn+1 at Step 148. Further, the CMY vector Spn+1 calculated at Step 102 to Step 116 is updated with the ink quantity vector Ipn+1 and Formula (1) above. As a result, lattice points which are CMY lattice points and ink quantity lattice points readjusted with respect to a lattice of number p and in correspondence with each other can be determined.

(8) Other Embodiments:

In the above embodiment, the correspondence definition data is a color correction LUT. The color correction LUT is generated by subjecting print colors, specified by lattice points for correspondence definition data creation determined by a method according to the present invention, to color measuring. Needless to add, the embodiment of the present invention is not limited to this. For example, correspondence definition data may be a profile, and the profile may be generated by subjecting print colors, specified by lattice points for correspondence definition data creation determined by a method according to the present invention, to color measuring.

This embodiment is implemented by constituting a profile generating portion which is capable of generating profiles in the color correction LUT generator 20A illustrated in FIG. 1, instead of the color correction LUT generating portion 20i; and by constituting a profile storing portion, instead of the color correction LUT storing portion 20b. In this case, the profile generating portion generates profiles from color measuring data acquired by the color measuring data acquiring portion 20h, and the generated profiles are stored in the profile storing portion.

More specifically, a print patch wherein the components of CMYKlclm image data are the color components of ink quantity lattice points generated at the portion 20g for generating LUT before color matching is printed. Then, the color measuring data acquiring portion 20h acquires color measuring data obtained from color measuring by a color measuring instrument or the like. As a result, colors indicated by the ink quantity lattice points can be rendered in non-equipment dependent colors. Therefore, various types of profile can be generated. Such profiles include a profile wherein colors indicated by ink quantity lattice points are in correspondence with the above-mentioned sRGB image data; and a profile wherein colors indicated by ink quantity lattice points are in correspondence with coordinate data on coordinates in the Lab color space. These profiles are generated at the above-mentioned profile generating portion.

The profile only has to be capable of bringing image data which specifies colors in a specific color space into correspondence with CMYKlclm image data, and various modes can be adopted therefor. More specifically, it may be LUT which defines one-to-one color relation with respect to a plurality of representative points. Or, it may be a profile which defines color relation by specific functions, matrices, or the like. Alternatively, a profile may be generated in accordance with the ICC (International Color Consortium) standard. Needless to add, in this case as well, the present invention holds in a profile generator, a profile generating method, a profile generating program, and a recording medium therefor.

We claim:

1. A lattice point determining method for correspondence definition data creation whereby a plurality of lattice points which are referred to when correspondence definition data which defines correspondence between the ink quantities of inks in various colors used in a printing device and the color component values of various colors used in another image device is created are determined, the method comprising:

defining both an ink quantity lattice point smoothness evaluation function which evaluates the smoothness of disposition of ink quantity lattice points in an ink quantity space whose components are said color ink quantities of inks in various colors and a lower-dimensional color lattice point smoothness evaluation function which evaluates the smoothness of the disposition of lower-dimensional color lattice points in a lower-dimensional color space defined by a smaller number of color components than the number of these inks;

separately optimizing the ink quantity lattice points and the lower-dimensional color lattice points by separately enhancing the evaluations of said ink quantity lattice point smoothness evaluation function and said lower-dimensional color lattice point smoothness evaluation function;

maintaining either of the ink quantity lattice points and the lower-dimensional color lattice points at optimized lattice points and readjusting the other optimized lattice points; and imposing limitation on ink quantity caused to adhere to a printing medium as a binding condition when a plurality of said lattice points are determined by said maintaining and readjusting, and carrying out said readjustment.

2. The lattice point determining method for correspondence definition data creation, according to claim 1, wherein:

said readjustment is made by minimizing a first movement evaluation function containing a function whose value is increased with increase in the distance between the lattice points after readjustment and said other optimized lattice points.

3. The lattice point determining method for correspondence definition data creation, according to claim 1, wherein:

said limitation on ink quantity is limitation on the maximum quantity of ink adhering to a specific printing area.

4. The lattice point determining method for correspondence definition data creation, according to claim 3, wherein:

said maximum quantity of ink adhering is calculated by adding up the product of a weighting factor whose value is "0" or "1" defined for each ink quantity component value and each component value of said ink quantity lattice points.

5. The lattice point determining method for correspondence definition data creation, according to claim 1, wherein:

said limitation on ink quantity is limitation on the quantity of a specific color ink consumed at a specific gradation value.

6. The lattice point determining method for correspondence definition data creation, according to claim 5, wherein:

said limitation on the quantity of a specific color ink consumed is defined by a condition that the product of a weighting factor whose value is "0" or "1" defined for each ink quantity component value and each component value of said ink quantity lattice points is "0."

7. The lattice point determining method for correspondence definition data creation, according to claim 2, wherein:

if there is not a solution which minimizes said first movement evaluation function when the positions of said either optimized lattice points in said readjustment, it is permitted to fluctuate the positions of said either optimized lattice points and said readjustment is made by minimizing a second movement evaluation function containing a function whose value is increased with increase in the distance between the lattice points after readjustment and said other optimized lattice points and further increased with increase in the moving distance of said either optimized lattice points.

8. The lattice point determining method for correspondence definition data creation, according to claim 7, wherein:

in said second movement evaluation function, the unit fluctuation of said either optimized lattice points more greatly contributes to increase in the value of the second movement evaluation function than the unit fluctuation of said other optimized lattice points.

9. The lattice point determining method for correspondence definition data creation, according to claim 7, wherein:

in said second movement evaluation function, the unit fluctuation of components having a small absolute value of said either optimized lattice points more greatly contributes to increase in the value of the second movement evaluation function than the unit fluctuation of components having a large absolute value in comparison.

* * * * *